(12) United States Patent
Baikerikar et al.

(10) Patent No.: US 8,273,801 B2
(45) Date of Patent: *Sep. 25, 2012

(54) PROTECTIVE COATING FOR WINDOW GLASS

(75) Inventors: Kiran Baikerikar, Midland, MI (US); Syed Z. Mahdi, Rochester Hills, MI (US)

(73) Assignee: Dow Global Technologies LLC, Midland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,205

(22) Filed: Nov. 2, 2011

(65) Prior Publication Data
US 2012/0046375 A1 Feb. 23, 2012

Related U.S. Application Data

(60) Continuation of application No. 12/859,822, filed on Aug. 20, 2010, now Pat. No. 8,080,299, which is a division of application No. 11/472,119, filed on Jun. 20, 2006, now Pat. No. 7,781,493, and a continuation of application No. 11/643,455, filed on Dec. 20, 2006, now Pat. No. 7,786,183, which is a continuation-in-part of application No. 11/472,119, filed on Jun. 20, 2006, now Pat. No. 7,781,493.

(60) Provisional application No. 60/692,318, filed on Jun. 20, 2005.

(51) Int. Cl.
*C08J 3/28* (2006.01)
*C08L 33/10* (2006.01)

(52) U.S. Cl. ............. 522/91; 525/29; 525/301; 525/925

(58) Field of Classification Search .................... 522/91; 525/29, 301, 929
See application file for complete search history.

(56) References Cited

U.S. PATENT DOCUMENTS

| | | |
|---|---|---|
| 3,549,396 A | 12/1970 | Dietz |
| 3,971,751 A | 7/1976 | Isayama et al. |
| 4,072,340 A | 2/1978 | Morgan |
| 4,122,074 A | 10/1978 | Pepe et al. |
| 4,218,513 A | 8/1980 | Williams et al. |

(Continued)

FOREIGN PATENT DOCUMENTS

DE 32 41 516 A1 5/1984

(Continued)

OTHER PUBLICATIONS

Office Action from Japanese Patent Office for corresponding JP Patent Application 2008/518404 filed ; mailed Jan. 10, 2012; sent by foreign associate on Feb. 6, 2012.

*Primary Examiner* — Satya Sastri
(74) *Attorney, Agent, or Firm* — Dobrusin & Thennisch PC

(57) ABSTRACT

The invention is a composition comprising: a) one or more film forming resins having at least one functional group capable of polymerization; b) one or more reactive diluents capable of reacting with the film forming resin; c) one or more silicon, titanium, zirconium, aluminum or metal containing compounds capable of promoting adhesion of the composition to glass; d) one or more fillers capable of imparting abrasion resistance to the composition when cured; and e) one or more compounds which is reactive with the film forming resin which also contains at least one acidic moiety. The composition of the invention is useful as a frit on the window of a vehicle.

13 Claims, 2 Drawing Sheets

U.S. PATENT DOCUMENTS

| | | | |
|---|---|---|---|
| 4,232,088 A | 11/1980 | Humphrey et al. |
| 4,302,503 A | 11/1981 | Mattimoe |
| 4,345,053 A | 8/1982 | Rizk et al. |
| 4,368,236 A | 1/1983 | Frye |
| 4,374,237 A | 2/1983 | Berger et al. |
| 4,496,611 A | 1/1985 | Kawakubo et al. |
| 4,526,811 A | 7/1985 | Jialanella |
| 4,561,625 A | 12/1985 | Weaver |
| 4,584,245 A | 4/1986 | Kuga et al. |
| 4,610,115 A | 9/1986 | Thompson |
| 4,618,656 A | 10/1986 | Kawakubo et al. |
| 4,622,369 A | 11/1986 | Chang et al. |
| 4,625,012 A | 11/1986 | Rizk et al. |
| 4,645,816 A | 2/1987 | Pohl et al. |
| 4,687,533 A | 8/1987 | Rizk et al. |
| 4,688,752 A | 8/1987 | Barteck et al. |
| 4,761,916 A | 8/1988 | Sanok et al. |
| 4,777,191 A | 10/1988 | Komar et al. |
| 4,780,520 A | 10/1988 | Rizk et al. |
| 4,788,254 A | 11/1988 | Kawakubo et al. |
| 4,816,132 A | 3/1989 | Kotani et al. |
| 4,822,680 A | 4/1989 | Catalano et al. |
| 4,837,274 A | 6/1989 | Kawakubo et al. |
| 4,839,122 A | 6/1989 | Weaver |
| 4,906,707 A | 3/1990 | Yukimoto et al. |
| 4,923,927 A | 5/1990 | Hirose et al. |
| 4,950,581 A | 8/1990 | Koike et al. |
| 4,963,614 A | 10/1990 | Ito et al. |
| 4,970,244 A | 11/1990 | Komai et al. |
| 4,999,136 A | 3/1991 | Su et al. |
| 5,011,900 A | 4/1991 | Yukimoto et al. |
| 5,061,567 A | 10/1991 | Brochot et al. |
| 5,063,269 A | 11/1991 | Hung |
| 5,063,270 A | 11/1991 | Yukimoto et al. |
| 5,071,692 A | 12/1991 | Jourdaine |
| 5,082,736 A | 1/1992 | Bravet et al. |
| 5,139,307 A | 8/1992 | Koops et al. |
| 5,223,597 A | 6/1993 | Iwakiri et al. |
| 5,260,350 A | 11/1993 | Wright |
| 5,279,882 A | 1/1994 | Daude et al. |
| 5,296,295 A | 3/1994 | Perkins et al. |
| 5,342,914 A | 8/1994 | Iwakiri et al. |
| 5,368,943 A | 11/1994 | Baghdachi et al. |
| 5,372,889 A | 12/1994 | Harisiades et al. |
| 5,391,588 A | 2/1995 | Sakamoto |
| 5,395,697 A | 3/1995 | Morrison |
| 5,409,995 A | 4/1995 | Iwahara et al. |
| 5,413,748 A | 5/1995 | Garza |
| 5,502,045 A | 3/1996 | Miettinen et al. |
| 5,502,145 A | 3/1996 | Szum |
| 5,541,266 A | 7/1996 | Hasegawa et al. |
| 5,554,217 A | 9/1996 | Bäbler |
| 5,567,833 A | 10/1996 | Iwahara et al. |
| 5,603,798 A | 2/1997 | Bhat |
| 5,623,044 A | 4/1997 | Chiao |
| 5,637,363 A | 6/1997 | Leray et al. |
| 5,648,173 A | 7/1997 | Blizzard |
| 5,650,467 A | 7/1997 | Suzuki et al. |
| 5,664,041 A | 9/1997 | Szum |
| 5,672,652 A | 9/1997 | Bhat |
| 5,683,804 A | 11/1997 | Nagashima et al. |
| 5,716,571 A | 2/1998 | LeLievre |
| 5,786,096 A | 7/1998 | Yoneda et al. |
| 5,795,501 A | 8/1998 | Kano |
| 5,807,515 A | 9/1998 | Fisher et al. |
| 5,852,137 A | 12/1998 | Hsieh et al. |
| 5,864,996 A | 2/1999 | Veldman et al. |
| 5,895,721 A | 4/1999 | Naoumenko et al. |
| 5,915,780 A | 6/1999 | Kobrehel et al. |
| 5,922,809 A | 7/1999 | Bhat et al. |
| 5,948,927 A * | 9/1999 | Gunther et al. ............... 556/419 |
| 5,976,305 A | 11/1999 | Bhat et al. |
| 5,976,702 A | 11/1999 | Yoneda et al. |
| 5,977,202 A | 11/1999 | Chawla et al. |
| 6,090,866 A | 7/2000 | Kranig et al. |
| 6,116,774 A | 9/2000 | Sasaki et al. |
| 6,126,737 A | 10/2000 | Mason |
| 6,134,851 A | 10/2000 | Roze et al. |
| 6,150,431 A | 11/2000 | Miller et al. |
| 6,150,756 A | 11/2000 | Wakelkamp et al. |
| 6,153,662 A | 11/2000 | Miller et al. |
| 6,174,606 B1 | 1/2001 | Brusic et al. |
| 6,191,187 B1 | 2/2001 | Yamamura et al. |
| 6,228,433 B1 | 5/2001 | Witt |
| 6,255,127 B1 | 7/2001 | Fujino et al. |
| 6,290,881 B1 | 9/2001 | Krohn |
| 6,302,681 B1 | 10/2001 | Douche et al. |
| 6,306,924 B2 | 10/2001 | Szum |
| 6,348,118 B1 | 2/2002 | Johnson et al. |
| 6,348,537 B2 * | 2/2002 | Sugamoto et al. ............ 524/493 |
| 6,355,127 B1 | 3/2002 | Mahdi et al. |
| 6,395,856 B1 | 5/2002 | Petty et al. |
| 6,438,306 B1 | 8/2002 | Bishop et al. |
| 6,461,419 B1 | 10/2002 | Wu et al. |
| 6,467,232 B1 | 10/2002 | Mackey |
| 6,512,033 B1 | 1/2003 | Wu |
| 6,582,804 B2 | 6/2003 | Wu et al. |
| 6,596,445 B1 | 7/2003 | Matsumoto et al. |
| 6,598,426 B2 | 7/2003 | Vandal et al. |
| 6,649,016 B2 | 11/2003 | Wu et al. |
| 6,653,394 B1 | 11/2003 | Meisenburg et al. |
| 6,675,541 B2 | 1/2004 | Mackey |
| 6,713,000 B2 | 3/2004 | Krohn |
| 6,719,422 B2 | 4/2004 | Wu et al. |
| 6,747,602 B2 | 6/2004 | Matsuoka et al. |
| 6,784,223 B2 | 8/2004 | Krohn |
| 6,797,746 B2 | 9/2004 | Cavazos-Gutierrez |
| 6,803,001 B2 | 10/2004 | Ito et al. |
| 6,828,403 B2 | 12/2004 | Mahdi et al. |
| 6,852,804 B2 | 2/2005 | Kennedy et al. |
| 6,946,628 B2 | 9/2005 | Shirlin et al. |
| 6,948,287 B2 | 9/2005 | Korn |
| 6,984,287 B2 | 1/2006 | Zhang |
| 6,995,208 B2 | 2/2006 | Mehta et al. |
| 7,022,748 B2 | 4/2006 | Wilke et al. |
| 7,024,822 B2 | 4/2006 | Scheer et al. |
| 7,119,129 B2 | 10/2006 | Krohn |
| 7,122,289 B2 | 10/2006 | Wilke et al. |
| 7,123,202 B2 | 10/2006 | Maeuser et al. |
| 7,129,444 B2 | 10/2006 | Weiss |
| 7,138,347 B2 | 11/2006 | Konno |
| 7,691,479 B2 | 4/2010 | Schmatloch et al. |
| 7,781,493 B2 * | 8/2010 | Baikerikar et al. ............ 522/91 |
| 7,786,183 B2 | 8/2010 | Baikerikar et al. |
| 7,807,016 B2 | 10/2010 | Schwöeppe et al. |
| 7,939,161 B2 | 5/2011 | Allam et al. |
| 7,955,696 B2 | 6/2011 | Baikerikar et al. |
| 7,955,702 B2 | 6/2011 | Schwoeppe et al. |
| 8,080,299 B2 * | 12/2011 | Baikerikar et al. ............ 428/38 |
| 8,101,043 B2 | 1/2012 | Allam et al. |
| 2001/0053445 A1 | 12/2001 | Kang et al. |
| 2002/0086914 A1 | 7/2002 | Lee et al. |
| 2002/0100550 A1 | 8/2002 | Mahdi et al. |
| 2002/0198279 A1 | 12/2002 | Ha |
| 2003/0040551 A1 | 2/2003 | Yamaguchi et al. |
| 2003/0158316 A1 | 8/2003 | Vanier et al. |
| 2003/0173026 A1 | 9/2003 | Wu et al. |
| 2004/0106718 A1 | 6/2004 | Krohn |
| 2005/0045103 A1 | 3/2005 | Mikhael et al. |
| 2005/0051536 A1 | 3/2005 | Shirlin et al. |
| 2005/0065226 A1 | 3/2005 | Mirone et al. |
| 2005/0113484 A1 | 5/2005 | Kamen et al. |
| 2005/0126683 A1 | 6/2005 | Hsieh et al. |
| 2005/0154076 A1 | 7/2005 | Bach et al. |
| 2006/0025496 A1 | 2/2006 | Grandhee et al. |
| 2006/0191625 A1 | 8/2006 | Kapp et al. |
| 2006/0198963 A1 | 9/2006 | Chernyshov et al. |
| 2006/0287408 A1 | 12/2006 | Baikerikar et al. |
| 2007/0002328 A1 | 1/2007 | Woods et al. |
| 2007/0078997 A1 | 4/2007 | Stern |
| 2007/0151178 A1 | 7/2007 | Baikerikar et al. |
| 2009/0162592 A1 | 6/2009 | Baikerikar et al. |

FOREIGN PATENT DOCUMENTS

| | | |
|---|---|---|
| DE | 199 61 632 A1 | 6/2001 |
| EP | 01 066 28 B1 | 7/1987 |
| EP | 03 774 44 A3 | 2/1990 |

| | | | |
|---|---|---|---|
| EP | 05 951 65 A2 | 5/1994 |
| EP | 06 662 90 A1 | 8/1995 |
| EP | 666290 A1 * | 8/1995 |
| EP | 06 877 13 A1 | 12/1995 |
| EP | 10 137 26 A1 | 6/2000 |
| EP | 11 530 90 A1 | 12/2000 |
| EP | 12 312 41 A1 | 8/2002 |
| EP | 11 530 90 B | 9/2002 |
| GB | 2 147 244 A | 5/1985 |
| GB | 2271308 B | 5/1995 |
| JP | 60-104412 A | 6/1985 |
| JP | 01-192540 A | 8/1989 |
| JP | 06-316444 A | 11/1994 |
| JP | 7-252333 A | 10/1995 |
| JP | 7-331179 A | 12/1995 |
| JP | 2001-89535 A | 4/2001 |
| JP | 2002/012635 A | 1/2002 |
| JP | 20050515291 A | 5/2005 |
| WO | 93/12935 A1 | 7/1993 |
| WO | 95/23772 A1 | 9/1995 |
| WO | 98/51745 A1 | 11/1998 |
| WO | 98/51746 A1 | 11/1998 |
| WO | 99/31191 A1 | 6/1999 |
| WO | 01/44381 A1 | 6/2001 |
| WO | 01/51567 A1 | 7/2001 |
| WO | 03/062310 A1 | 7/2003 |
| WO | 03/106579 A1 | 12/2003 |
| WO | 2005/003048 A1 | 1/2005 |
| WO | 2005/040055 A1 | 5/2005 |
| WO | 2005/052071 A1 | 6/2005 |
| WO | 2006/093671 A1 | 9/2006 |
| WO | 2007/002328 A1 | 1/2007 |
| WO | 2008/036721 A1 | 3/2008 |

* cited by examiner

PROTECTIVE COATING FOR WINDOW GLASS

CROSS REFERENCE TO RELATED APPLICATIONS

This application is a continuation of U.S. Ser. No. 12/859,822 filed Aug. 20, 2010, now U.S. Pat. No. 8,080,299. Ser. No. 12/859,822 is a division of Ser. No. 11/472,119, filed on Jun. 20, 2006, now U.S. Pat. No. 7,781,493. Ser. No. 12/859,822 is also a continuation of Ser. No. 11/643,455 filed Dec. 20, 2006, now U.S. Pat. No. 7,786,183, which is a continuation-in part of Ser. No. 11/472,119 (previously cited). This application claims the benefit of U.S. Provisional application No. 60/692,318, filed Jun. 20, 2005. These applications are incorporated herein by reference into this application in their entirety.

FIELD OF INVENTION

This invention relates to a coating for glass, plastic or plastic coated with an abrasion resistant coating. The invented coatings are preferably pigmented and under preferred conditions prevent transmission of 99 percent or more of light through the coating. Furthermore, the invention relates to a method for applying the coating to glass or coated plastic and a method for bonding such a coated glass or plastic window into a structure, for instance, an automobile or building. In another embodiment, the invention is a system useful for bonding glass or coated plastic to a structure comprising a coating of the invention and an adhesive which bonds to the coating of the invention when disposed on glass or coated plastic and which also bonds to the surface of the structure. In a preferred embodiment, the glass or coated plastic can be bonded into a structure without the need for applying a primer to the window prior to the bonding operation.

BACKGROUND OF INVENTION

Bonding a window into a structure often requires cleaning the window surface where the adhesive is tote-applied to remove contaminants, applying a primer to the area of the window to which the adhesive is to be applied, and then applying adhesive generally to the periphery of the window. Thereafter, the window with the adhesive applied thereto is placed into a window frame of the structure with the adhesive disposed between the window frame and the window and the adhesive is cured to hold the window in place. Typically, the window has deposited on its surface, about the periphery, a coating often referred to as an enamel or frit. This coating is typically a black border which is used to prevent degradation of the adhesive by exposure to ultraviolet radiation and is a means of hiding the underlying color trim and adhesives. The enamels are typically ceramic based and require firing temperatures of about 500° C. to 700° C. to cure. In order for the adhesives to bond to such an enamel, a primer is required. The primer is applied to the surface of the ceramic enamel located on the surface of the window. Generally, the ceramic enamel is applied to the glass prior to shaping of the glass. For many windshield applications, the glass needs to be curved. In most operations, the glass is bent to shape after application and curing of the ceramic enamel.

The problem with the present process is that a primer is required to get a good durable bond between the adhesive and the enamel located on the glass. Further, the high temperatures necessary to cure these ceramic enamels are undesirable. Additionally, an inorganic ceramic coating fused into the glass makes it difficult to recycle the glass when there is a defect in the glass which occurs during manufacture of the glass or at the end of life of a vehicle.

What is needed is a coating for glass which can be applied without the need for very, high curing temperatures, which can bond to standard adhesives without the need for pre-application of primers, and which facilitates recycling of the glass.

SUMMARY OF INVENTION

In one embodiment, the invention is a composition comprising:
a) one or more film forming resins having at least one functional group capable of polymerizing;
b) one or more reactive diluents capable of reacting with the film forming resin;
c) one or more silicon, titanium, zirconium, aluminum, or metal containing compounds capable of promoting adhesion of the composition to glass;
d) one or more fillers capable of imparting abrasion resistance to the composition when cured; and
e) one or more compounds which is reactive with the film forming resin which also contains an acidic moiety.

In a preferred embodiment, the composition further comprises f) one or more pigments capable of blocking the transmission of ultraviolet light or dyes capable of imparting color to the coating. In another preferred embodiment the functional groups capable of polymerizing the film-forming resin, polymerize when exposed to irradiation or a source of free radicals or cations. In another preferred embodiment, the composition further comprises g) one or more catalysts or initiators capable of initiating polymerization of the film-forming resin when exposed to irradiation or which initiates cationic polymerization. In a more preferred embodiment, the film-forming resin contains unsaturated moieties which polymerize when exposed to free radicals.

In another embodiment, the invention is glass, or plastic having an abrasion resistant coating deposited thereon, having a cured coating as described hereinbefore, disposed on a portion of one or more surfaces of the glass or coated plastic wherein the coating exhibits a light transmission of about 1 percent or less and an universal hardness of about 100 N/mm$^2$ or greater, more preferably 200 N/mm$^2$ or greater. In another embodiment, the invention is a coating comprised of a cured composition as described hereinbefore. In yet another embodiment, the invention is a window structure comprising a window frame and a window which comprises either glass or plastic coated with an abrasion resistant coating, which has a cured coating as described hereinbefore disposed on a surface of the glass or coated plastic. In another embodiment, the cured coating is bonded to an adhesive and the adhesive is further bonded to a window frame of the structure.

The invention also comprises a system for bonding glass or coated plastic to a structure wherein the system comprises a coating composition of this invention and an adhesive which bonds to the coating composition of the invention when disposed on glass or coated plastic and cured and which further bonds to the surface of the structure. Preferably, the adhesive contains functional moieties of isocyanate, siloxy or a mixture thereof.

In another embodiment, the invention comprises a method for coating glass, plastic or abrasion resistant coated plastic comprising applying a coating according to the invention to (a) glass or abrasion resistant coated plastic window and (b) exposing the coated window to conditions such that the coating cures. In a preferred embodiment, the glass is bent such that the surface upon which the coating is to be applied is curved. In one embodiment, the coating is pigmented and is applied to the periphery of one surface of the window. In yet another embodiment, the invention is a method for bonding a window into a structure which comprises applying an adhesive having isocyanate, siloxy or both isocyanate and siloxy functionality to the surface of the coating comprising the cured composition of this invention disposed on the periphery of the window; (c) contacting the window with a window frame of a structure wherein the adhesive is located between the window and the window frame and (d) allowing the adhesive to cure.

The coating of the invention and the processes described related to the coating of the invention offers significant advantages over those of the art. In particular, the coating of the invention can be applied to curved surfaces which allow application after shaping of the substrate such as a window. Since this coating is not fused into the glass at high temperatures, the coating allows recycling of the glass or plastic coated with an abrasion resistant coating either at the end of the life of the structure in which it is used or when there is a defect in the glass or plastic substrate. Known adhesives for bonding to glass materials are capable of bonding in a primerless manner to the cured coatings of the invention. The adhesive bond to the coatings of the invention are durable under extreme conditions, and is expected to last for a significant portion of, if not the entire life of, the structure to which the glass or plastic is bonded. Furthermore, the coating is abrasion resistant and provides good opacity, that is, low UV light transmission, preferably less than about 1 percent.

FIGURES

DETAILED DESCRIPTION OF INVENTION

Figure 1:
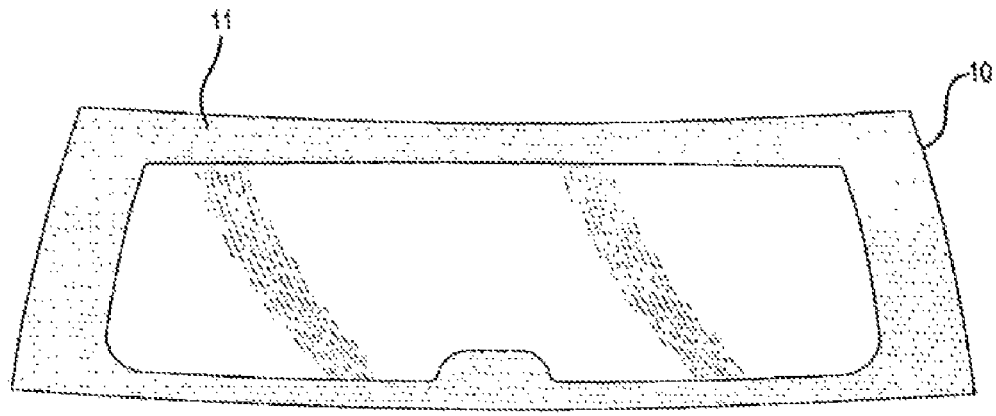
FIG. 1 illustrates window glass with a coating located on the window.

In one aspect, the invention is a coating composition useful for coating glass and plastic which has previously been coated with an abrasion resistant coating. Alternatively, the coating composition can be used to coat a plastic substrate and render the coated surface abrasion resistant. One component of the composition is a film-forming resin capable of forming a continuous matrix which can be cured by common curing techniques. A film-forming resin can be any resin which forms a continuous film and which cures under reasonable conditions. The film-forming resin contains one or more moieties which, under reasonable conditions, are able to polymerize and therefore form a continuous matrix and which is resistant to many environmental forces. In a preferred embodiment, preferably the film-forming resin polymerizes when exposed to free, radicals or to cationic reaction conditions. In a preferred embodiment, the film-forming resin is a resin that cures by exposure to irradiation, such as UV radiation or an electron beam. In a preferred embodiment, the film-forming resin contains functional groups which polymerize when exposed to free radicals, such as vinyl, acrylate, styrenic, diene, methacrylate, allyl, thiolene, vinyl ether, unsaturated ester, imide, N-vinyl, acrylamide containing moieties and mixtures thereof and the like. In a more preferred embodiment, the functional groups on the film-forming resin are acrylic and/or methacrylic moieties. In many embodiments, the film-forming resin is an oligomer or prepolymer having the described functional moieties. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, amido and spiro ortho carbonate esters or mixtures thereof. A more preferred class of oligomers and, prepolymers are the aliphatic urethane acrylates. Examples of aliphatic urethane acrylate oligomers or prepolymers which are commercially available include those from Cytec Surface Specialties under the trademark EBECRYL and designations 264, 265, 284N, 1290, 4866, 8210, 8301, 8402, 8405, 5129 and 8411; those available from Sartomer under the designations CN985B88, 964, 944B85, 963B80, CN 929, CN 996, CN 968, CN 980, CN 981, CN 982B90, CN 983, CN991; CN 2920, CN 2921, CN 9006, CN 9008, CN 9009, CN 9010; GENOMER 4302 and 4316 available from Rahn; PHOTOMER 6892 and 6008 available from Cognis; NK OLIGO™ U24A and U-15HA™ available from Kowa. Additional suppliers of aliphatic urethane acrylates include the BR series of aliphatic urethane acrylates such as BR 144 or 970 available from Bomar Specialties or the LAROMER series of aliphatic urethane acrylates from BASF.

To form an appropriate film, molecular weight is an important attribute. The tower molecular weight of the film-forming resin is preferably selected such that the film-forming resin when coated on a substrate forms a continuous matrix which retains the nature of a film and is a continuous matrix upon cure. The upper limit on molecular weight is the highest molecular weight at which the film forming resin is capable of being processed under reasonable conditions. Dendrimers having higher molecular weights may be used wherein the resulting composition can be processed using equipment typically used by those skilled in the art. The film-forming resin is present in the composition in a sufficient, amount to form a continuous matrix when applied to a substrate and cured. In a preferred embodiment, the film-forming resin is present in an amount of about 10 parts by weight or greater and more preferably about 15 parts by weight or greater, based on the weight of the composition. Preferably, the film-forming resin is present in the composition in an amount of about 70 parts by weight or less based on the weight of the composition and more preferably about 60 parts by weight or less, more preferably about 50 parts by weight or less and most preferably 40 parts by weight or less. As used herein, all parts by weight are based on 100 parts by weight of the recited base material or composition. In a case of the coating composition, this means the weights are based on 100 parts by weight of the coating composition.

The composition may further comprise a reactive diluent in sufficient amounts such that the composition has the desired viscosity. Generally, the desired viscosity is such that the composition is capable of being processed and forms a good coating. Any compound which reacts with the film-forming resin under polymerization conditions and which has low viscosity may be used. The reactive diluent may be monofunctional in that it has one functional group which will react with the other active components of the system. In another embodiment the reactive diluent can be any polyfunctional compound capable of reacting with the film-forming resin to introduce links between the polymer chains formed during curing of the film-forming resin. As used herein, polyfunctional means two or more functional groups on average and more preferably three or more functional groups. Preferably, the polyfunctional reactive diluent has a functionality of about 3 or less. As used herein, polyfunctional shall be applied in a nominal nature in that it relates to compounds which have a theoretical functionality of two or more as opposed to actual functionality. In particular, imperfections as a result of processing or formation of byproducts are ignored in determining whether a compound is polyfunctional according to this definition. In reality, many compounds which are theoretically di- or polyfunctional have a lower functionality than theoretical due to the formation of byproducts and incomplete reactions. Preferably, the reactive diluent has unsaturated compounds which polymerize when exposed to free radicals or compounds which react via cationic reaction mechanisms. Examples of functional moieties which may be used in the reactive diluent include vinyl, acrylate, styrenic, diene, methacrylate, allyl, acrylamide, methacrylamide, cycloaliphatic epoxide, alpha epoxide, acrylonitrile, and methacrylonitrile containing moieties, combinations thereof and the like. Preferred functional groups are those functional groups which polymerize when exposed to free radicals. Among preferred functional groups which polymerize when exposed to free radicals are vinyl, acrylate, styrenic, diene, methacrylate, and allyl containing moiety, combinations thereof and the like. Representative examples of monofunctional reactive diluents useful include styrene, alpha-methylstyrene, substituted styrene, vinyl ester, vinyl ether, N-vinyl-2-pyrrolidone, (meth)acrylamide, N-substituted (meth)acrylamide, octyl (meth)acrylate, nonylphenol ethoxylate (meth)acrylate, isononyl (meth)acrylate, isobornyl (meth)acrylate, 2-(2-ethoxyethoxy)ethyl (meth) acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth) acrylate, (meth)acrylic acid, N-vinylcaprolactam, N-vinylformamide, stearyl (meth)acrylate, hydroxy functional caprolactone ester (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like. In one preferred embodiment, the reactive diluent is a monofunctional acrylate. Among preferred monofunctional acrylates are 2-(2-oxy)ethyl acrylate, 2-phenoxy ethyl acrylate, hydroxyl ethyl acrylate, other long chain alkyl acrylates, isobornyl acrylate, cyclic trimethylol propane formal acrylate, monofunctional aliphatic urethane acrylates, mixtures thereof and the like. In a more preferred embodiment, the reactive diluent is a polyacrylate. Examples of polyacrylate reactive diluents include ethylene glycol di(meth)acrylate, hexanediol di(meth)acrylate, triethylene glycol di(meth)acrylate, tetraethylene glycol di(meth) acrylate, dipropylene glycol di)meth)acrylate, trimethylolpropane tri(meth)acrylate, ethoxylated trimethylolpropane tri (meth)acrylate, glycerol tri(meth)acrylate, pentaerythritol tri (meth)acrylate, pentaerythritol tetra(meth)acrylate, tris(2-hydroxyl-ethyl)isocyanurate triacrylate ditrimethylolpropane tetra(meth)acrylate, and alkoxylated polyol derived di or polyacrylates, such as propoxylated neopentyl glycol diacrylate or propoxylated glycol triacrylate, neopentyl glycol di(meth)acrylate, combinations of these, and the like. Preferred reactive diluents are diacrylates such as 1,6 hexanediol diacrylate, 1,9 nonanediol diacrylate, 1,4 butanediol acrylate, tricyclodecane dimethanol diacrylate, cyclohexane dimethanol diacrylate, alkoxylated cyclohexane diacrylates, tripropylene glycol diacrylate and the like. More preferred reactive diluents include propoxylated neopentyl glycol diacrylate, propoxylated glyceryl triacrylate and tripropylene glycol diacrylate. The diluent is present in a composition in sufficient amounts to provide a tough film which is capable of resisting many common environmental attacks and a viscosity which is amenable to the desired coating application method. Among most preferred monofunctional acrylate monomers is isobornyl acrylate. The reactive diluent is present in a sufficient amount to achieve the desired viscosity of the composition. Preferably, the reactive diluent is present in the composition in an amount of about 2 parts by weight or greater based on the weight of the composition, preferably about 5 parts by weight or greater and more preferably about 10 parts by weight or greater. The reactive diluent is preferably present in the composition in an amount of about 30 parts by weight or less, more preferably about 25 parts by weight or less and most preferably about 20 parts by weight or less based on the weight of the composition.

In a preferred embodiment, a mixture of reactive diluents is used in the coatings of the invention. Most preferably, a blend of monofunctional, difunctional, and trifunctional diluents are used. The amount of reactive diluent having a functionality of greater than 2 percent is that amount which improves the scratch resistance of the coating. Preferably, the reactive diluent with a functionality of greater than 2 is present in an amount of about 1 part by weight or, greater, more preferably about 3 parts by weight or greater and most preferably about 4 parts by weight or greater. Preferably, the reactive diluent having a functionality greater than 2 is present in an amount of about 15 parts by weight or less and more preferably about 12 parts by weight or less and most preferably about 10 parts by weight or less.

The choice of a reactive diluent has an impact on the working time and the shelf life of the uncured coating. Working time is the time from initial reaction of the functional groups until the surface of the liquid coating formulation skins over. Shelf life is how long a curable composition can be stored until the composition cures such that the composition can no longer be used for its intended purpose. If no free radical inhibitor is used to stabilize the liquid compositions, then the following reactive diluents offer optimal performance with respect to both working time and shelf-life: propoxylated neopentyl glycol diacrylate and propoxylated glyceryl triacrylate.

The composition further contains one or more adhesion promoter(s) which are capable of enhancing the bonding of the composition to glass, coated plastic and/or an isocyanate or siloxy functional adhesive. An adhesion promoter (coupling agent) is defined herein as a material having at least one group capable of reacting, binding and/or associating with a group on at least one surface of the substrates to be bonded together. In one non-limiting embodiment, an adhesion promoter can serve as a molecular bridge at the interface of at least two surfaces wherein the surfaces can be similar or dissimilar surfaces. Adhesion promoters, in another non-limiting embodiment, can be monomers, oligomers and/or polymers. Such materials include, but are not limited to, organometallics such as silanes, titanates, (ˆ) zirconates, aluminates, metal containing compounds, zirconium aluminates, hydrolysates thereof and mixtures thereof. Preferably, such adhesion promoter contains titanium or silicon and most preferably contains siloxy (silicone and oxygen) linkages. Preferably, the silicon-containing adhesion promoter is a polysiloxane such as those disclosed in U.S. Pat. No. 5,502,045 at column 2, lines 8-20 and at column 3, lines 3-54, incorporated herein by reference; tetraorthosilicates as disclosed in U.S. Pat. No. 6,306,924 at column 2, lines 26-39 and column 3, lines 24-42, relevant parts incorporated herein by reference; and multifunctional silanes such as those disclosed in Mahdi et al., U.S. Pat. No. 6,355,127 at column 21, lines 44 to column 22, line 38, relevant parts incorporated herein by reference or adhesion promoters that are reaction products of these silanes and other intermediates. Non-limiting examples of silane coupling agents include: vinyltriacetoxysilane, vinyltrimethoxysilane, vinyltri(2-methoxyethoxy) silane, vinyltriphenoxysilane, vinyltriisopropoxysilane, vinyltri-t-butoxysilane, divinyldiethoxysilane, γ-glycidoxypropyltrimethoxysilane, allyltriethoxysilane, allyltrimethoxysilane, (3-acryloxypropyl)dimethylmethoxysilane, (3-acryloxypropyl)-methyldimethoxysilane, (3-acryloxypropyl)trimethoxysilane, (methacryloxy-methyl)dimethylethoxysilane, methacryloxymethyltriethoxysilane, methacryloxymethyltrimethoxysilane, methacryloxypropyldimethylethoxysilane, methacryl-oxypropyltrimethoxysilane, styrlethyltrimethoxysilane, mercaptomethyl-methyldiethoxysilane, 3-mercaptopropylmethyldimethoxysilane, 3-mercaptopropyl-triethoxysilane, 3-mercaptopropyltrimethoxysilane, and amino silanes, such as aminopropyltrimethoxysilane, bis(trimethoxysilyl)propyl amine, or bis(triethoxysilyl)propyl amine; at least partial hydrolysates thereof or mixtures thereof. Titanate, zirconate or zircoaluminate adhesion promoters useful in this invention include those described in Wu et al., U.S. Pat. No. 6,649,016, column 7, line 23 to column 8, line 53, relevant parts incorporated herein by reference. Preferred titanium adhesion promoters include those commercially available under the TYZOR name from DuPont or tetra (2,2 diallyoxymethyl) butyl, di(ditridecyl)phosphito titanate (commercially available as KR 55, from Kenrich Petrochemicals, Inc.); neopentyl (diallyl) oxy, trineodecanonyl titanate; neopentyl(diallyl) oxy, tri(dodecyl)benzene-sulfonyl titanate; neopentyl (diallyl)oxy, tri(dioctyl)phosphato titanate; neopentyl (diallyl) oxy, tri(dioctyl)pyro-phosphato titanate; neopentyl (diallyl)oxy, tri(N-ethylenediamino)ethyl titanate; neopentyl (diallyl)oxy, tri(m-amino)phenyl titanate; neopentyl(diallyl) oxy, trihydroxy caproyl titanate; isopropyldimethylacrylisosteroyl titanate; tetraisopropyl (dioctyl) phosphito titanate; at least partial hydrolysates thereof or mixtures thereof. Preferred zirconium adhesion promoters include zircon aluminates. Non-limiting examples of zirconate adhesion promoters include tetra (2,2 diallyloxymethyl)butyl, di(ditridecyl)phosphito zirconate (commercially available as KZ 55 from Kenrich. Petrochemicals, Inc.); neopentyl(diallyl) oxy, trineodecanoyl zirconate; neopentyl(diallyl) oxy, tri(dodecyl)benzene-sulfony zirconate; neopentyl(diallyl)oxy, tri(dioctyl)phosphato zirconate; neopentyl(diallyl)oxy, tri(dioctyl)-pyrophosphato zirconate neopentyl(diallyl)oxy, tri(N-ethylenediamino)ethyl zirconate; neopentyl(diallyl)oxy, tri(m-amino)phenyl zirconate; neopentyl(diallyl)oxy, trimethacryl zirconate; neopentyl(diallyl) oxy, triacryl zirconate; dineopentyl(diallyl)oxy, diparamino benzoyl zirconate; dineopentyl(diallyl)oxy, di(3-mercapto) propionic zirconate; at least partial hydrolysates thereof or mixtures thereof. Generally, the adhesion promoters are present in a sufficient amount to achieve a durable bond of the coating to glass, plastic or coated plastic, and preferably to form a durable bond to the isocyanate or siloxy-functional adhesive. If too little adhesion promoter is used, then poor adhesion will be exhibited by the coating to the glass, plastic, coated plastic and/or adhesive. If too much adhesion promoter is utilized, the coating composition may be unstable. In this context "unstable" means that the composition may cure before being exposed to the desired curing conditions. Adhesion promoters are preferably present in an amount of about 1 part by weight or greater based on the weight of the composition, more preferably about 6 parts by weight or greater and most preferably about 8 parts by weight or greater and preferably about 10 parts by weight or greater. Preferably, the adhesion promoter is present in an amount of about 30 parts by weight or less based on the weight of the composition and more preferably about 20 parts by weight or less.

In a preferred embodiment, the composition comprises either one or both of two silane adhesion promoters, one selected from the group of polysiloxanes and tetraorthosilicates and a second selected from a group of multifunctional silanes.

Preferred tetraalkylorthosilicates are described by the following formula:

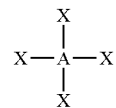

wherein A is Si, and where X is separately in each occurrence hydrolyzable groups that can be hydrolyzed from the tetrasubstituted compound in the presence of water. Examples of hydrolyzable groups include, but are not limited to, halogen (e.g., chlorine, fluorine and bromine), formyloxy, acetoxy, propionyloxy, valeryloxy, stearoyloxy, benzoyloxy, naphthoyloxy, toluoyloxy, maleoyloxy, alkoxy, alkylthio, vinyloxy, allyloxy, vinyletheroxy, methacryloxy and acryloxy. These and other groups herein are defined according to the IUPAC Nomenclature Rules (1969). Preferably, the hydrolyzable groups X are independently an alkoxy group or a group containing ethylenic unsaturation. Preferably, the alkoxy group is a $C_1$-$C_6$ alkoxy. Upon hydrolysis, the $C_1$-$C_6$ alkoxy groups form volatile alcohols, which can escape from the coating composition by evaporation. Examples of such $C_1$-$C_6$ alkoxy groups include, but are not limited to, methoxy, ethoxy, isopropoxy, n-butoxy, sec-butoxy, isobutoxy and tert-butoxy. Most preferably, the alkoxy groups are methoxy and ethoxy. When the hydrolyzable group contains ethylenic unsaturation, the ethylenic unsaturation may react with other ethylenically unsaturated compounds in the coating composition. Such hydrolyzable groups containing ethylenic unsaturation include, but are not limited to, vinyloxy, allyoxy, vinyletheroxy, methacryloxy and acryloxy. It is contemplated that X may be the same or different in each instance. Preferably, the tetrasubstituted compound is a liquid so that it may, be easily added to a coating composition. Alternatively, the tetrasubstituted compound may be a solid that is soluble in the coating composition. The compositions of the present invention may contain one tetrasubstituted compound or it may contain a mixture of tetrasubstituted compounds.

Tetramethoxy silane and tetraethoxy silane may be purchased as tetramethyl orthosilicate and tetraethyl orthosilicate respectively, from the Aldrich Chemical Company of Milwaukee, Wis. or from Silbond Corporation under the trademark SILBOND.

The preferred polysiloxanes useful in the invention are preferably illustrated by the following formula:

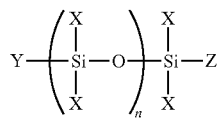

wherein Y and Z are independently selected from the group consisting of halogen, amino, alkyl and alkoxy; n is one or more; and each X is as defined hereinbefore. As used herein the term "alkyl" shall mean a monovalent straight chain or branched chain group of carbon atoms including, but not limited to, methyl, ethyl, n-propyl, isopropyl, n-butyl, sec-butyl, isobutyl, tertbutyl and the like. As used herein the term "alkoxy" shall mean an alkyl group attached to the remainder of the molecule through an oxygen atom including, but not limited to, methoxy, ethoxy, isopropoxy, n-butoxy, sec-butoxy, isobutoxy, tert-butoxy and the like. Preferably, the alkyl portions of the alkoxy groups are lower alkyl groups. As used herein, the term "lower alkyl group" shall mean an alkyl group, branched or unbranched, cyclic or acyclic, having from 1 to 10 carbon atoms inclusive. Some examples of lower alkyl groups include, but are not limited to, methyl, ethyl, propyl, isopropyl, butyl, pentyl and cyclohexyl. Most preferably, each alkyl group is methyl or ethyl. As used herein the term "lower alkoxy group" shall mean an alkyl group attached to the remainder of the molecule through an oxygen atom, where the alkyl group is a lower alkyl group.

It is contemplated that the siloxane main chain may be linear or branched. A branched structure results when some Xs are alkoxy groups and some Xs are siloxane groups. It is also contemplated that each alkoxy group may be the same or different. Preferably, the poly(siloxane) is a liquid so that it may be easily added to a polymeric coating composition. Alternatively, the poly(siloxane) may be a solid that is soluble in the polymeric coating composition. The compositions of the present invention may contain one poly(siloxane) or it may contain a mixture of poly(siloxanes).

Multifunctional silanes comprise compounds which have a silane functionality and a second functional group including epoxy, amino, vinyl, isocyanate, isocyanaurate, mercapto, acrylate, methacrylate groups and the like. Preferred adhesion promoters for adhesion to coated surfaces, such as those coated with a clear coat or a pigmented coating, include the amino alkoxy silanes, vinyl alkoxy silanes, isocyanato alkoxy silanes, epoxyalkoxy silanes, mercaptosilanes and isocyanaurate functional alkoxy silanes for instance. More preferred multifunctional silanes include gamma-glycidoxy-propyltrimethoxy silane, gamma-aminopropyltrimethoxy silane, gamma-isocyanato-propyltrimethoxy silane, n-beta-(aminoethyl)gamma-aminopropyl-trimethoxy silane, n-(2-aminoethyl)-3-aminopropylmethyldimethoxy silane, 3-aminopropylmethyl-dimethoxy silane, 3-aminopropylmethyldimethoxy silane, bis-(gamma-trimethoxysilyl-propylamine), bis(triethoxysilyl)propyl amine, n-phenyl-gamma-aminopropyl-trimethoxysilane, gamma-isocyanatopropyl-methyldimethoxy silane, gamma-isocyanatopropyltriethoxy silane, beta (3,4-epoxy-cyclohexyl)ethyl-triethoxysilane, gamma-glycidoxypropylmethyldimethoxy silane, tris(gamma-trimethoxysilylpropypyl)isocyanurate, 3-acryloxypropyltrimethoxysilane, 3-methacryloxypropyltrimethoxysilane, vinyltriethoxysilane, or vinyltrimethoxysilane.

In another preferred embodiment, the adhesion promoter is the Michael addition product of siloxane further containing one or more active hydrogen containing functional moieties with having two or more acrylate groups. The reaction product preferably has four or greater siloxy groups and more preferably 6 or greater. The reaction product preferably contains no active hydrogen atoms. The reaction products also preferably has at least one unsaturated group capable of reacting in the presence of free radicals. Preferably, the acrylate containing reactant is an alkoxylated polyol derived di or polyacrylate such as propoxylated neopentyl glycol diacrylate, propoxylated glyceryl triacrylate, or other diacrylates such as hexanediol diacrylate, tripropylene glycol diacrylate, dipropylene glycol diacrylate, cyclohexanedimethanol diacrylate, alkoxylated cyclohexanedimethanol diacrylates, nonanediol diacrylate, and the like. The Michael addition product is prepared by reacting the reactants at elevated temperatures of about 30° C. to about 60° C., preferably about 55° C. for a sufficient time such that all of the functional groups having active hydrogen atoms are reacted for instance, all amines are tertiary amines. Preferably, the reactants are reacted at elevated temperatures for greater than about 72 hours. The nature of the alkoxy groups on the Michael addition product impacts the speed of cure of the coating composition of the invention. Methoxy groups hydrolyze faster and thus the curing reaction goes faster when methoxy groups are found on the siloxy groups. When higher alkoxy groups are present the reaction is slower. The overall reaction speed, and thus working time can be adjusted by adjusting the relative amount of alkoxy groups on the adhesion promoters and the ratio of the methoxy groups to higher alkoxy groups present.

In another embodiment, the adhesion promoter is a high molecular weight adduct having multiple alkoxysilane moieties. Preferably, the adduct has 3 or greater alkoxysilane moieties and more preferably 6 or greater. Preferably, the adduct has a number average molecular weight of about 500 Da or greater and more preferably 1,000 Da or greater. The adduct preferably contains no reactive hydrogen containing moieties. In a preferred embodiment, the adduct is the reaction product of an epoxy silane, such as gamma propyl trimethoxy epoxy silene or gamma propyl triethoxy epoxy silane, with one or more silanes having reactive hydrogen containing moieties under conditions that an excess of epoxy equivalents is present as compared to active hydrogen containing moieties. Preferably, the equivalent ratio of epoxy moieties to active hydrogen containing moieties is about 1.1 or greater; and more preferably about 1.12. Preferably, the equivalent ratio of epoxy equivalents to active hydrogen containing moieties is about 1.14 or less. The preferred active hydrogen containing moieties are amine and mercapto with amine being most preferred. The epoxy silane active hydrogen containing silane reacted product is thereafter reacted with the reaction product of an aliphatic di- or polyisocyanate, such as tetramethylene diisocyanate (TMDI), and an active hydrogen functional moiety containing silane, for instance, an aminosilane or mercaptosilane. The two reaction products are reaction in a sufficient ratio such that the resulting adduct contains no active hydrogen atoms or isocyanate groups. The resulting adduct is added to the coating compositions in a sufficient amount to enhance the long term adhesion of the coating composition to substrates and adhesive systems. Preferably, the high molecular weight alkoxysilane containing adduct is present in an amount of about 1 part by weight or greater and more preferably about 5 parts by weight or greater. The high molecular weight alkoxysilane containing adduct is preferably present in an amount of about 15 parts by weight or less and more preferably about 10 parts by weight or less. The high molecular weight alkoxysilane adduct is preferably added to the coating composition of the invention in admixture with a reactive diluent as described hereinbefore. In a preferred embodiment, the adhesion promoter comprises a mixture of the Michael addition product containing alkoxysilane groups and the high molecular weight alkoxysilane adducts, preferably the two types of adducts are used in a ratio of about 1 to about 15 and more preferably about 1 to about 5.

The composition further comprises a filler. The filler can be any filler which is capable of improving the abrasion resistance and surface hardness of the cured composition. Further, the filler must be capable of being dispersed in the coating composition. Preferred classes of fillers are silicates, aluminas, zirconias, carbides, or any other fillers with high hardness (Mohs Hardness of greater than about 7), combinations thereof and, the like. Preferred fillers are silicates and aluminas, with aluminas being more preferred. Preferred fillers are those which contain surface hydroxyls. More preferred aluminas useful in the invention are alpha aluminas. Preferably, the fillers have a particle size of about 10 microns or less and most preferably 5 microns or less. The filler is present in a sufficient amount to enhance the surface hardness and abrasion resistance and in an amount such that a homogeneous dispersion can be prepared. Preferably, the filler is present in an amount of about 5 percent by weight or greater based on the weight of the composition, more preferably about 25 percent by weight or greater and most preferably about 30 percent by weight or greater. The filler is preferably present in an amount of about 60 parts by weight or less based on the weight of the composition, more preferably about 50 parts by weight or less and most preferably about 40 parts by weight or less.

The composition further comprises a compound which is reactive with the film-forming resin and which also contains an acidic moiety. In particular, the compound has a functional group or moiety which will react with the functional moieties contained in the film-forming resin. Preferably, such a reactive group undergoes reaction when exposed to free radicals, radiation or cations. Such moieties are described hereinbefore. The compound which is reactive with the film-forming resin and which contains an acidic moiety is present for the purpose of enhancing bonding of the composition to glass, plastic or coated plastic and to adhesive systems. Preferably, the acid group is a strong acid group; such strong acids include carboxylic acids, phosphoric acids, sulfuric acids and sulfonic acid groups. Preferred acid groups are carboxylic acid groups and phosphoric acid groups, such as phosphate acids. The most preferred acid groups are carboxylic acid groups. Preferably, the compound is a compound which has an acid group and one or more functional groups which polymerize when exposed to free radicals, radiation or which react when contacted with cations. Preferable are compounds which polymerize when exposed to free radicals or radiation, such as acrylate, vinyl, allyl, vinyl ether or (meth)acrylate groups. Preferably, a nonfunctional alkyl chain connects the ethylenic unsaturated group to the strong acid group. Among preferred classes of acid-containing compounds are acidic functional acrylates or (meth)acrylates, including methacrylic acids, acrylic acids, acrylated phosphate acid esters, mono-2-(methacryloxy)ethyl maleate or phosphoric monoacrylate, maleic acids, itaconic acids mixtures thereof and the like. The acid is present in a sufficient amount to enhance bonding to the glass or coated plastic and/or adhesive. If too much acid is used, the stability of the composition may be negatively impacted. The reactive acid-containing compound is present in the composition in an amount of about 1 part by weight or greater based on the composition and preferably about 4 parts by weight or greater. The reactive acid compound is preferably present in the composition in an amount of about 10 weight parts or less and more preferably about 8 weight parts or less.

The composition may further comprise pigments or dyes. The pigments or dyes may be present to provide a desired color or to provide opacity to the composition. Preferably, the pigments or dyes are durable, meaning that they have good outdoor durability and resist fading upon exposure to sun and the elements. Preferably, the pigments reduce light transmission through the coating. In a preferred embodiment, the pigments are capable of reducing light transmission through the coating to less than 1 percent of the light in contact with the coating. Furthermore, it is preferable that the pigments or dyes do not interfere in bonding of the coating to glass, plastic, coated plastic or an adhesive. Pigments or dyes useful in the invention may be organic or inorganic. Preferable inorganic pigments include black iron oxides, zinc oxide, cerium oxide, and titania ($TiO_2$), while preferable organic pigments include carbon black, phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines and mixtures thereof. It will be recognized by those skilled in the art that organic pigments will be differently shaded, or even have different colors, depending on the functional groups attached to the main molecule. A list of commercial pigments which are useful in the compositions of the invention are disclosed in U.S. Patent Application 2002/0086914 relevant, portions incorporated herein by reference. Preferred pigments include carbon black or black iron oxides. In the embodiment where the composition is used to coat a window, it is preferable that the pigment utilized be a black pigment. Further, it is preferred that the pigment be carbon black. Any known carbon black may be utilized in the invention. Some grades of carbon black are conductive and others are treated to be non-conductive. The carbon black should be selected to match the environment in which the coating is utilized. For instance, some automotive applications require that the carbon black be non-conductive to prevent interference with other functionality placed on or near the windows of the vehicle. In other environments, it may be desirable for the coating to have conductivity and conductive carbon black may be selected. The pigments or dyes are used in an amount sufficient to give the desired functionality to the coating. In particular, if the pigment or dye is used simply for coating, then the sufficient amount of pigment or dye is used to get the desired color. Conversely, if the pigments are added to introduce opacity to the coating, then a sufficient amount of pigment is used to introduce the desired level of opacity. In a preferred embodiment, the pigment is black and then utilized to introduce opacity to the coating. Preferably, the dyes are translucent. The pigment should be present in an amount such that the cured coating exhibits the desired light transmittance, preferably of less than 1 percent at the desired coating thickness. Preferably the pigment or dye is present in an amount of about 1 part by weight or greater, more preferably about 2 parts by weight or greater, even more preferably about 3 parts by weight or greater, more preferably about 5 parts by weight or greater and most preferably about 8 parts by weight or greater. Preferably, the amount of pigment useful is about 15 parts by weight or less and most preferably about 12 parts by weight or less.

The composition may further comprise a catalyst or initiator capable of initiating cure of the film-forming resin, under curing conditions. Preferably, those curing conditions are sufficient to cause formation of free radicals or cations. Preferred catalysts or initiators include photoinitiators which initiate free radical polymerization by the formation of free radicals or which generate cations, or thermal initiators which generate free radicals or which form or release cations when exposed to heat. Photoinitiator systems having a corresponding sensitivity to actinic radiation are normally incorporated into formulations containing compounds of the present invention and upon irradiation lead to the formation of reactive species capable of initiating polymerization. In the preferred embodiment, the initiator is a compound which when exposed to irradiation initiates free radical polymerization. Examples of photoinitiators include alpha aminoketones, alpha hydroxyketones, phosphine oxides, phenylglyoxalates, thioxanthones, benzophenones, benzoin ethers; oxime esters, amine synergists, maleimides, mixtures thereof and the like. Preferable photoinitiators include compounds in the following categories: phosphine oxides, ketones and their derivatives, benzophenones, carbocyanines and methines, polycyclic aromatic hydrocarbons, such as, anthracene or the like, and dyestuffs, such as xanthenes, safranines and acridines. More generally, these are essentially chemical substances belonging to one of the following major categories: compounds containing carbonyl groups, such as pentanedione, benzil, piperonal, benzoin and its halogenated derivatives, benzoin ethers, anthraquinone and its derivatives, p,p'-dimethylaminobenzophene, benzophenone and the like; compounds containing sulfur or selenium, such as the di- and polysulfides, xanthogenates, mercaptans, dithiocarbamates, thioketones, beta-napthoselenazolines; peroxides; compounds containing nitrogen, such as azonitriles, diazo compounds, diazides, acridine derivatives, phenazine, quinoxaline, quinazoline and oxime esters, for example, 1-phenyl-1, 2-propanedione 2-[0-(benzoyl)oxime]; halogenated compounds, such as halogenated ketones or aldehydes, methylaryl halides, sulfonyl halides or dihalides; phosphine oxides and, photoinitiator dyestuffs, such as diazonium salts, azoxybenzenes and derivatives, rhodamines, eosines, fluoresceines, acriflavine or the like. Common photoinitiators include 2,2-diethoxyacetophenone, dimethoxyphenylacetophenone, phenyl benzoin, benzophenone, substituted benzophenones, phosphine oxides and the like. It is understood by those skilled in the art that when benzophenone and similar compounds are used as photoinitiators a synergistic agent, such as a tertiary amine or polymeric amine such as a secondary or primary amine terminated polypropylene oxide) polyol are employed to enhance the conversion of photoadsorbed energy to polymerization-initiating free radicals.

The photoinitiators supply to the molecules containing unsaturation or to the initiator part of the energy transmitted by the light. By means of the unsaturated systems or of a photoinitiator, the photosensitizers produce free radicals or ions which initiate the polymerization or the cross-linking of the composition. It is also possible to use mixtures with known photoinitiators for example, mixtures with camphorquinone; benzophenone; benzophenone derivatives (e.g. 1-[4-(4-benzoyl-phenylsulfanyl)-phenyl]-2-methyl-2-(toluene-4-sulfonyl)-propan-1-one); acetophenone, acetophenone derivatives, for example, α-hydroxycycloalkyl phenyl ketones or dialkoxyacetophenones; α-hydroxy- or α-aminoacetophenones, for example, oligo-[2-hydroxy-2-methyl-1-[4-(1-methylvinyl)-phenyl]-propanone], 2-hydroxy-2-methyl-1-phenyl-propanone, 2-hydroxy-1-[4-(2-hydroxyethoxy)-phenyl]-2-methyl-propan-1-one, 2-methyl-1-[4-(methylthio)phenyl]-2-(4-morpholinyl)-propan-1-one, 2-dimethylamino-2-(4-methylbenzyl)-1-(4-morpholin-4-yl-phenyl)-butan-1-one, 2-benzyl-2-dimethylamino-1-(3,4-dimethoxy-phenyl)-butan-1-one, 2-benzyl-2-dimethylamino-1-(4-morpholin-4-yl-phenyl)-butan-1-one, 2-methyl-1-(4-methylsulfanyl-phenyl)-2-morpholin-4-yl-propan-1-one; 4-aroyl-1,3-dioxolanes; benzoin alkyl ethers and benzil ketals, for example, benzil dimethyl ketal, phenyl glyoxalates and derivatives thereof, for example, methylbenzoyl formate; dimeric phenyl glyoxalates, for example, oxo-phenyl-acetic acid 2-[2-(2-oxo-2-phenyl-acetoxy)-ethoxy]-ethyl ester; peresters, for example, benzophenone-tetracarboxylic acid peresters, as described, for example, in EP 126 541 (U.S. Pat. No. 4,777,191 and U.S. Pat. No. 4,970, 244 incorporated herein by reference); monoacylphosphine oxides, for example, (2,4,6-trimethylbenzoyl)-diphenyl-phosphine oxide or phenyl-(2,4,6-trimethylbenzoyl)-phosphinic acid ethyl ester, bisacylphosphine oxides, for example, bis(2,6-dimethoxybenzoyl)-(2,4,4-trimethyl-pent-1-yl) phosphine oxide, bis(2,4,6-trimethylbenzoyl)-phenyl-phosphine oxide or bis(2,4,6-trimethylbenzoyl)-(2,4-dipentoxyphenyl)phosphine oxide, trisacylphosphine oxides; halomethyltriazines, for example, 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine; hexaaryl-bisimidazole/coinitiator systems, for example, ortho-chloro-hexaphenyl-bisimidazole together with 2-mercaptobenzthiazole; ferrocenium compounds or titanocenes, for example, dicyclopentadienyl bis(2,6-difluoro-3-pyrrolo-phenyl)titanium; borate photoinitiators or O— acyloxime photoinitiators as described, for example, in GB 2,339,571 (U.S. Pat. No. 6,596,445 incorporated herein by reference).

It is also possible to add thermal free radical initiators, for example, benzoyl peroxide (other suitable peroxides are described in U.S. Pat. No. 4,950,581, column 19, lines 17-25), incorporated herein by reference or cationic initiators, such as aromatic sulfonium, phosphonium or iodonium salts, as described, for example, in U.S. Pat. No. 4,950,581, column 18, line 60 to column 19, line 10 incorporated herein by reference. An example of an iodonium salt, is (4-isobutyl-phenyl)-4-methylphenyl-iodonium hexafluorophosphate. Maleimide derivatives, as described, for example, in U.S. Pat. No. 6,153,662 or U.S. Pat. No. 6,150,431 both incorporated herein by reference, may also be present. Examples which may be mentioned are N-(2-trifluoromethyl-phenyl)maleimide and N-(2-tert-butylphenyl)maleimide.

Among preferred classes of photoinitiators are alpha aminoketones, phosphine oxides, alpha hydroxyketones, mixtures thereof and the like with the phosphine oxides most preferred. Among preferred photoinitiators are 1-hydroxycyclohexyl-phenylketone available from Ciba Geigy under the trademark and designation IRGACURE 184, 2-benzyl 2-N-dimethylamino-1-(4-morpholinophenyl)-1-butanone available from Ciba Geigy under the trademark and designation IRGACURE 369 or IRGACURE 379, and phosphine oxides available from BASF under the trademark LUCIRIN TPO, IRGACURE 819 available from Ciba, mixtures thereof, such as SARCURE™ SR 1135 from Sartomer or ESCACURE KTO 46 from Lambert, which is a mixture of an alpha hydroxy ketone benzophenone derivatives and a phosphine oxide, and the like. Preferably, the catalyst or initiator is present in a sufficient amount to catalyze polymerization when exposed to appropriate polymerization conditions as described hereinafter. Preferably, the catalyst or initiator is present in an amount of about 0.1 part by weight or greater based on the weight of the composition, more preferably about 1 part by weight or greater based, even more preferably about 2 parts by weight or greater and most preferably about 4 parts by weight or greater. Preferably, the catalyst or initiator is present in an amount of about 20 parts by weight or less, more preferably about 12 parts by weight or less, even more preferably about 10 parts by weight or less and, most preferably about 8 parts by weight or less based on the weight of the composition.

The coating compositions of the invention cure by two mechanisms. First, they cure as a result of free radical polymerization of the unsaturated moieties or cation is polymerization. Further, the coatings cure by silanol condensation. The silanol condensation proceeds upon exposure to atmospheric moisture. This is a relatively slow curing mechanism in the absence of a catalyst. Silanol condensation is catalyzed by acid, base or organic metallic catalysts, as described hereinafter with respect to the adhesive systems. The coating compositions of the invention contain acidic containing compounds and may contain amines which catalyze the reaction. Alternatively, a moisture cure catalyst as described hereinafter may be added.

The composition may further comprise a dispersant or surfactant which stabilizes the dispersion of solid particles in the liquid medium and facilitates formation of a continuous void-free film. Suitable dispersants are all surface-active compounds, preferably cationic, anionic and non-ionic surfactants, as well as polymeric dispersants which disperse components in the composition of the invention and which stabilize the compositions, that is prevent the compositions from phase separating or components from precipitating from the compositions. Examples of dispersants which may be used according to the invention include the anionic surfactants for example, lignosulfonates, dialkyl sulfosuccinates, sulfated or sulfonated fatty acids or fatty acid esters of fatty acids, reaction products of ethylene oxide and/or propylene oxide with saturated or unsaturated fatty acids, fatty alcohols, fatty amines, alicyclic alcohols or aliphatic-aromatic hydrocarbons which have been esterified in the terminal position by an inorganic oxygen-containing acid or a polybasic carboxylic acid. Useful dispersants include the following non-ionic surfactants: ethylene oxide adducts from the class of the addition products of ethylene oxide with higher fatty acids, saturated or unsaturated fatty alcohols, fatty amines, mercaptans, fatty acid amides, fatty acid alkylol amides or fatty amines or with alkylphenols or with alkylthiophenols, with from 5 to 100 mol of ethylene oxide being used per mole of the mentioned compounds, as well as ethylene oxide-propylene oxide block polymers and ethylene-diamine-ethylene oxide-propylene oxide adducts. These include: reaction products of saturated and/or unsaturated fatty alcohols having from 8 to 20 carbon atoms with from 20 to 100 mol of ethylene oxide per mol of alcohol, preferably saturated linear $C_{16}$-$C_{18}$ alcohols with from 25 to 80 mol, especially 25 mol, of ethylene oxide per mol of alcohol; reaction products of saturated and/or unsaturated fatty acids having from 8 to 20 carbon atoms with from 5 to 20 mol of ethylene oxide per mol of acid; reaction products of alkylphenols having from 7 to 12 carbon atoms with from 5 to 25 mol of ethylene oxide per mol of phenolic hydroxy group, preferably mono- or dialkylphenols with from 10 to 20 mol of ethylene oxide per mol of phenolic hydroxyl group; reaction products of saturated and/or unsaturated fatty acid amides having up to 20 carbon atoms with from 5 to 20 mol of ethylene oxide per mol of acid amide, preferably oleic acid amides with from 8 to 15 mol of ethylene oxide per mol of acid amide; reaction products of saturated and/or unsaturated fatty amines having from 8 to 20 carbon atoms with from 5 to 20 mol of ethylene oxide per mol of amine, preferably oleylamines with from 8 to 15 mol of ethylene oxide per mol of amine; ethylene oxide-propylene oxide block polymers having from 10 to 80 percent ethylene oxide and molecular weights from 1,000 to 80,000; ethylene oxide-propylene oxide adducts with ethylenediamine. Another useful class of dispersants are polymeric dispersants and protective colloids, including amphiphilic copolymers, block copolymers or graft or comb polymers, especially those based on acrylic acid, methacrylic acid or salts thereof, hydroxyalkyl(meth) acrylic acid, aminoalkyl(meth)acrylic acid or salts thereof, 2-acrylamido-2-methylpropanesulfonic acid (AMPS) or salts thereof, maleic anhydride or salts thereof, (meth)acrylamide or substituted (meth)acrylamides, vinyl heterocycles, for example vinylpyrrolidone, vinylimidazole, as well as amphiphilic polymers containing segments of (polyethylene oxide) PEO or EO/PO (ethylene oxide/propylene oxide) copolymers. Examples of suitable protective colloids are polyvinyl alcohol, polyvinylpyrrolidone or its copolymers. Also suitable are copolymers of synthetic monomers, especially of monomers having carboxyl groups, for example copolymers of 2-vinylpyrrolidone with 3-vinylpropionic acid or maleic acid copolymers and salts thereof.

Most preferred dispersants and surfactants include polymeric amide hyperdispersants available from Noveon under the trademark SOLSPERSE 32000 and 39000 and polypropylene oxide based ammonium salts, such as diethylpolypropoxy methyl ammonium chloride available from Degussa under the trademark and designation VARIQUAT CC-59 and diethyl polypropoxy 2-hydroxy ammonium phosphate available from Degussa under the trademark and designation VARIQUAT CC-42NS, and phosphate acid esters such as RHODAFAC RS-610 and RE 610 available from Rhodia and the like. The dispersant functions to disperse pigment and filler particles and prevents their agglomeration and settling. The dispersant and/or surfactant are present in a sufficient amount to achieve a continuous void-free film and to facilitate the formation of a homogeneous composition. If too much dispersant is used adhesion of the coating to the adhesive may be negatively impacted. If too little dispersant is used the composition may not form a homogeneous mixture. The dispersants are preferably used in an amount of about 0.5 parts by weight or greater based on the weight of the composition, and most preferably about 1.0 parts by weight or greater. The dispersant and/or surfactant are preferably used in an amount of about 10 parts by weight or less, and most preferably about 5 parts by weight or less based on the weight of the composition. Commonly, the concentration of the dispersant is calculated based on the amount of pigment and/or filler. Therefore the amount of dispersant is preferably about 0.5 parts by weight or greater based on the amount of pigment and filler, more preferably about 1 part by weight or greater, even more preferably 5.0 parts by weight or greater, and most preferably about 10 parts by weight or greater. The amount of dispersant is preferably about 75 parts by weight or less based on the amount of pigment and filler, and more preferably about 50 parts by weight or less. The appropriate amount of dispersant is highly dependent on the surface area of the fillers and pigments and must be adjusted accordingly.

The composition may further comprise a surface active agent present to improve substrate wetting and the appearance of the coating. Any surface active agent which is useful in improving the substrate wetting and appearance of the coating may be used. Preferred surface active agents include those which have limited influence on intercoat adhesion, such as polydimethyl siloxanes with low silicone content, silicone acrylates, silicone-free wetting agents/surfactants, mixtures thereof and the like. More preferred surface active agents include polyether modified polydimethylsiloxanes with low silicone content, silicone acrylates, and silicone-free wetting agents which do not affect intercoat adhesion, mixtures thereof and the like. The most preferred surface active agents include silicone acrylates, such as those available from Tego Chemie (Degussa) under the trademark and designation TEGO RAD 2100, 2200N, 2250 and 2300 or the BYK UV 3500 series (3500, 3510, 3530, 3570) available from BYK Chemie or polyacrylates such as Modaflow from UCB. The surface active agents are present in the composition in a sufficient amount to improve the surface appearance of the coating, substrate wetting and leveling. Preferably, the surface active agents are present in an amount of about 0.05 parts by weight or greater, even more preferably about 0.1 parts by weight or greater and most preferably about 0.2 parts by weight or greater based on the weight of the composition. The surface active agent is preferably present in an amount of about 1 part by weight or less, more preferably about 0.5 parts by weight or less based on the weight of the composition.

The composition may further comprise defoamers and/or deaerators. The compositions of the invention may foam during processing which can cause problems with respect to surface and appearance of the coating. Any defoamer and/or deaerator which prevents foaming or the formation of bubbles and which does not negatively impact the adhesive properties of the composition may be used. Preferable defoamers are silicone defoamers, silicone free defoamers, polyacrylate defoamers, mixtures thereof and the like. More preferred defoamers include FOAM BLAST™ 20F FOAM BLAST™ 30 and FOAM BLAST™550 polyacrylate defoamers available from Lubrizol; TEGO AIREX™ 920 polyacrylate defoamer and TEGO AIREX™ 980 or FOAMEX N™ silicone based defoamers available from Degussa or BYK 1790 silicone-free defoamer from BYK Chemie. The defoamer/deaerator is present in the compositions of the invention in a sufficient amount to prevent formation of bubbles and/or foam. If too much is used, adhesion to the desired surfaces and adhesives may be negatively impacted. Preferably, the defoamer and/or deaerator are present in an amount of about 0.05 parts by weight or greater based on the weight of the composition, and more preferably about 0.1 part by weight or greater. Preferably, the defoamer/deacerator are present in an amount of about 1.0 part by weight or less based on the weight of the composition.

The composition of the invention may further comprise polymerization inhibitors that are present in the composition for the purpose of preventing polymerization prior to exposure to curing conditions. Any polymerization inhibitor which prevents polymerization of the functional groups contained in the composition may be used. In the preferred embodiment where the functional groups polymerize when exposed to free radicals, the following classes of polymerization inhibitors may be used: hydroquinones, phenothiazines, mixtures thereof and the like. Among preferred polymerization inhibitors are 4-methoxyphenol (MEHQ), phenothiazine, XENOXYL available from Avecia, IRGASTAB UV 10 from Ciba, ADDITIVE™ 01-468 or GENORAD™ 16 available from Rahn. The most preferable polymerization inhibitor is phenothiozine. Generally, the polymerization inhibitor is present in a sufficient amount to inhibit polymerization before exposure to conditions for polymerization. The polymerization inhibitor should not be present in, such an amount that when exposed to free radicals as desired, the composition does not undergo polymerization. Preferably, the polymerization inhibitor is present in an amount of about 0.05 weight parts or greater, more preferably about 0.1 weight parts or greater and most preferably about 0.2 weight parts or greater based on the weight of the composition. Preferably, the polymerization inhibitor is present in an amount of about 2 weight parts or less and more preferably about 1 weight parts or less based on the weight of the composition.

The composition may further include compounds or polymers which improve the water resistance and/or adhesion of the composition to the substrate. Among compounds useful for this purpose are polybutadiene acrylates, silyated polymers (such as the reaction products of isocyanatosilanes and hydroxy functional acrylates or aminosilanes and multifunctional acrylates). To improve weatherability, the following components may be added: hindered amine light stabilizers known to those skilled in that art, such as TINUVIN™ 123 or 5100 from Ciba Geigy or SANDUVOR™ TB-02 or 3058 from Clariant, ultraviolet absorbers stabilizers known to those skilled in that art, such as TINUVIN™ 400 or 1130 available from Ciba Geigy, SANDUVOR™ PR-31 available from Clarion or HOMBITEC™ RM 300 available from Sachtleben. The compositions may further include antioxidants, such as those well known to those skilled in the art, for example, IRGANOX™ 1035 or 1076 from Ciba Geigy or ETHANOX™ 376 and ETHAFOS™ 368 from Albemarle. The compositions also may include moisture scavengers to improve the hydrolytic stability of the composition. Any moisture scavenger known in the art which does not interfere with the functioning of the composition may be used. Among preferred moisture scavengers are vinyltrimethoxysilane, triethylortho-formate, triethylorthoacetate and molecular sieve powders such as SYLOSIV™ available from Grace Davison.

The composition may further comprise colloidal silica acrylates for the purpose of improving hardness and abrasion resistance. Among preferred colloidal silica acrylates are silica nanoparticle dispersions in acrylates such as isobornyl acrylate, hexane diol diacrylate, tripropylene glycol acrylate propoxylated neopentyl glycol diacrylate propoxylated glyceryl triacrylate or acrylate oligomers. Such dispersions are available from Clariant under the trademark HIGHLINK NANO and from Hanse-Chemie under the trademark NANOCRYL. Colloidal alumina nanoparticle dispersions in acrylate monomers, such as NANODUR from Nanophase Technologies, or NANOBYK from BYK-Chemie could also be used to improve the hardness and scratch resistance of the coatings. In addition, polyethylene, polytetrafluoroethylene or polypropylene wax dispersions in acrylate monomers, such as the EVERGLIDE or S-390 series of products from Shamrock Technologies could be used to further improve scratch resistance and the slip. Alternatively, the wax can be added in powder form. The wax dispersions are preferably present in an amount of about 0.5 parts by weight or greater and preferably about 1 or greater. The wax dispersion is present in an amount of about 10 parts by weight or less, preferably 5 parts by weight or less of the coatings.

Flexibilizers or rubber tougheners can also be used to improve the flexibility and adhesion of the coatings. Any flexibilizer or toughener known in the art which improves the flexibility or toughness of the coating and which does not impair the desired properties of the coatings of the invention may be used. Preferred flexibilizers are thermoplastic acrylic bead resins such as the ELVACITE™ thermoplastic acrylic bead resins from Lucite (Ineon Resins) or HYCAR resins from Noveon.

The coating composition preferably has a viscosity which allows it to be processed, that is, pumped and applied and which facilitates the formation of a void-free film when coated on a substrate. The specific viscosity that may be used will be dictated by the application method. For instance, formulations for screen printing will require much higher viscosity than formulations used for ink jet printing. For example, if the composition is applied by screen printing the composition typically has a viscosity of about 2,000 centipoises or greater and more preferably about 5,000. Preferably, the composition has a viscosity of 50,000 centipoise or less. If the composition is applied by ink jet printing, the composition has a viscosity of 5 centipoises or greater. Preferably, the composition has a viscosity of 50 centipoises or less. If the composition is applied by spraying it onto the substrate, the composition has a viscosity of 5 centipoises or greater. Preferably, the composition has a viscosity of 100 centipoises or less.

The composition of the invention may be prepared by contacting the ingredients and blending. The processes and equipment for achieving this are well known to those skilled in the art. The materials are contacted under conditions such that a stable homogeneous dispersion is prepared. Any equipment and processes which provides this result may be used. The materials may be contacted at about ambient temperature (about 20-25° C.) to about 60° C. and preferably at ambient temperature. The components may be blended in air and preferably blended in a dry environment to improve the hydrolytic stability of the composition. The materials are blended for a sufficient time to prepare a homogeneous dispersion. Preferably, the materials are blended for about 60 minutes or greater, more preferably about 90 minutes or greater. Preferably, the materials are blended for a period of about 240 minutes or less and more preferably about 180 minutes or less. If the particles and pigments in the dispersion are too large, the particles or the coating prepared from the composition may have poor appearance. Therefore, it is desired that the filler and pigment be present in a particle size which allows dispersion into the composition and which allows the preparation of a void-free continuous coating which has reasonable flexibility and appearance. In the event the particle size is too large, the composition may be subjected to a grinding step. This grinding may occur in any equipment known to those skilled in the art for performing such grinding (i.e. ball milling, horizontal or vertical media milling, sand or pebble milling, etc). Preferably, the particle, size is equal to or less than 10 microns and more preferably less than 5 microns. Once, the composition is blended to form a homogeneous solution and the particle sizes are adjusted to the needs of the composition, the coating may be stored. Preferably, the composition is stored in a dry environment to prevent instability. In a preferred embodiment, the fillers and/ or pigments are dispersed in a reactive diluent with the aid of dispersants before they are added to the coating compositions of the invention. If the particle size of the pigments or fillers is too large, the dispersions are subjected to a grinding step prior to adding them to the compositions of the invention.

The coating may be applied to glass or coated plastic in any means known to those skilled in the art. It may be applied in conventional means such as using a brush, roller, sprayed onto the surface, ink jet printing, screen printing and the like. Preferably, the composition can be applied using robotic application devices. Such devices are well known to, those skilled in the art. After application of the coating to the surface of the substrate, the coating is exposed to polymerization conditions, that is, conditions which cause the composition to undergo polymerization. For compositions wherein the functional groups of the film-forming resin and other reactive components are those which react when exposed to free radicals, this means performing some operations which causes the catalyst or initiator to initiate the formation of free radicals and free radical polymerization. In a preferred embodiment, the catalyst or initiator is a photoinitiator and polymerization is initiated by exposing the composition to irradiation, such as ultraviolet light or electronic beam. The energy source used for achieving crosslinking of the radiation functionality may be actinic (e.g the radiation having a wavelength in the ultraviolet or visible region of the spectrum), accelerated particles (e.g., electron beam radiation), thermal (e.g., heat or infrared radiation), or the like. Preferably, the energy source is actinic radiation or accelerated particles, because such energy source provides excellent control over the initiation and rate of crosslinking. Additionally, actinic radiation and accelerated particles can be used for curing at relatively low temperatures. This avoids degrading components that might be sensitive to the relatively high temperatures that might be required to initiate crosslinking of the radiation curable groups when using thermal curing techniques. Suitable sources of actinic radiation include mercury lamps, electrodeless lamps, xenon lamps, carbon arc lamps, tungsten filament lamps, lasers, electron beam energy, sunlight, and the like. Ultraviolet radiation, especially from xenon lamps, medium pressure mercury lamps or electrodeless lamps is most preferred. Preferably, the initiator is a photoinitiator and in this embodiment polymerization is initiated by exposure to ultraviolet radiation. The amount of radiation to which the composition is exposed is that amount which results in initiation of free radical polymerization in the presence of a photoinitiator and provides the desired final properties of the coating.

In another embodiment, the invention is glass or abrasion resistant coated plastic having a cured coating of the invention deposited on the surface. The glass or plastic can be flat or shaped. Included in shaped glass is glass having a curved surface. Glass or coated plastic with a coating of the invention can be used for any use for which glass or coated plastic is known to be used by one skilled in the art. Preferably, the glass or coated plastic is used as a window and the coating is found on the periphery of the window. Preferably, the coating is located about the periphery of the window such that it is capable of blocking transmission of light to prevent it from contacting the adhesive, which bonds the window into a structure. The coating on the periphery also hides the trim components disposed about the periphery of the window. Preferably, the coating exhibits an ultraviolet light transmission of about 1 percent or less of the light to which the coating is exposed to and more preferably about 0.5 percent or less. In a preferred embodiment, the glass is curved and the advantage of the coating of the invention is that the coating can be deposited on the glass after the glass is shaped. Preferably, the glass is pre-shaped prior to application of the coating. Preferably the cured coating demonstrates an abrasion resistance such that after 500 cycles according to ASTM D1044 test the coating retains a light transmittance of less than 1 percent. Preferably, the coating demonstrates an abrasion resistance of about Δ περχεντ T<1 percent; more preferably about Δ percent T<0.75 percent, and most preferably about Δ percent T<0.5 percent, as determined according to the test ASTM D1044.

The coated glass or plastic is preferably used as a window and preferably used as a window in an automobile. FIG. 1 illustrates a window according to the invention. FIG. 1 further illustrates a window (10) with a frit (11) located about the periphery of the window (10).

Figure 2:
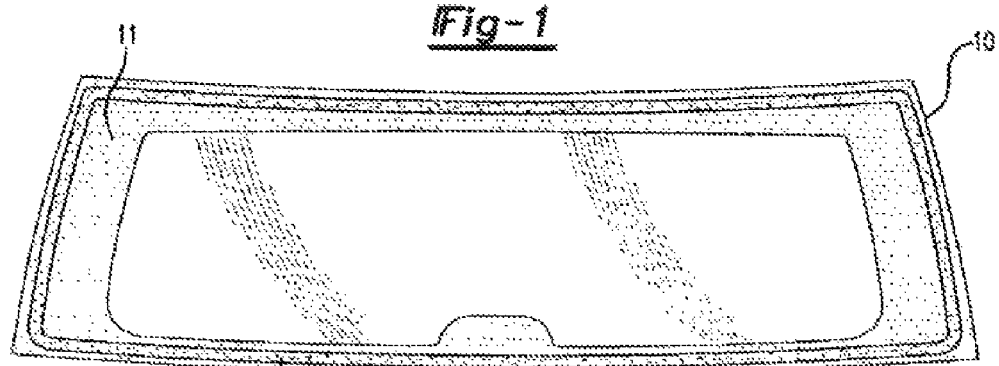
FIG. 2 shows a window with the coating, adhesive and a portion of the structure to which it is bonded.

In another embodiment, the invention is a window made of glass or coated plastic with a cured coating disposed about the periphery of the window and an adhesive applied to the coating. FIG. 2 illustrates one embodiment of this invention, wherein a window (10) has located on it a frit (11) and applied to the frit on the window is a bead of adhesive (12). The bead of adhesive (12) is disposed about the periphery of the window (10) such that it forms a continuous bead of adhesive (12) which is capable of completely sealing around the periphery of the window.

The adhesive bead located about the periphery of the window can be any known adhesive bead useful in bonding windows into structures. In one embodiment, the adhesive can be an isocyanate functional, siloxy functional or combination of isocyanate and siloxy functional adhesive which cures when exposed to moisture. The system of the invention can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852, 137, U.S. Pat. No. 6,512,033, relevant portions incorporated herein by reference. Examples of commercial adhesives which may be used herein are BETASEAL™ 15630, 15625, 61355 adhesives available from The Dow Chemical Company. EFBOND™ windshield adhesives available from Eftec, WS 151™, WS212™ adhesives available from Yokohama Rubber Company, and SIKAFLEX™ adhesives available from Sika Corporation.

In one embodiment, the adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes, with the most preferred being the polyethers. Examples of such adhesive compositions are those disclosed in Mahdi, U.S. 2002/01550 A1. Even more preferably the polymer is a polyether having silane moieties capable of silanol condensation. In some embodiments, the polymers useful in the invention are polymers as disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; or Suzuki et al., U.S. Pat. No. 5,650,467, all incorporated herein by reference. More preferably such polymers are oxyalkylene polymers containing at least one reactive silicon group per molecule.

The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. The hydrolyzable group is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoxime group, an amino group, an amido group, an amino-oxy-group, a mercapto group, and an alkenyloxy group. An alkoxy group is more preferred with a methoxy or ethoxy group being most preferred, for ease in handling due to their mild hydrolyzability. One to three hydroxyl groups or hydrolyzable groups may be bonded to one silicon atom. Where two or more hydroxyl groups or hydrolyzable groups are present per reactive silicon group, they may be the same or different. The reactive silicon group may have one or more silicon atoms.

In one embodiment, the flexible, polymer used in the adhesive composition is a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, preferably the contacting is performed without addition of catalyst. Polyols which may be used to prepare the silyl terminated prepolymer include polyols useful in preparing polyurethane prepolymers useful in adhesive and elastomer applications and are well known to those skilled in the art. Bhat et al., U.S. Pat. No. 5,672,652, see column 4, lines 5 to 60, (relevant parts incorporated herein by reference) discloses the preferred polyols useful in preparing the silane terminated prepolymers. The polyether polyol preferably has a weight average molecular weight of about 2,000 or greater, more preferably about 3,000 or greater, even, more preferably about 6,000 or greater, even more preferably about 10,000 or greater and most preferably 12,000 or greater. The resulting polyether polyol preferably has a weight average molecular weight of about 20,000 or less, more preferably about 16,000 or less, even more preferably about 14,000 or less and most preferably about 12,000 or less. The polyols preferably demonstrate a low unsaturation level, preferably about 0.04 milliequivalent of unsaturation per gram of polyol or less and more preferably about 0.02 milliequivalent of unsaturation per gram of polyol or less. Also, included as useful polyols in this embodiment are polymers having a polyolefin backbone and terminal hydroxyl groups. Examples of such polyols are KRATON™ polyethylene/butylene polymers having terminal hydroxyls such as KRATON™ Liquid L-2203 polymer. Polyalkyleneoxide based polyether polyols prepared using double metal cyanide catalysts can also be used in this invention. They are especially attractive because of their low unsaturation level.

The polyols can be reacted with an isocyanato silane to prepare reactive silicone functional prepolymers. Such, isocyanato silane requires a silane group with a hydrolyzable moiety attached thereto. Isocyanato silanes useful in the invention are described in U.S. Pat. No. 4,618,656 at column 3, lines 24 to 34, incorporated herein by reference. The reaction of the polyol with an organo functional silane can be performed using conventional processes such as those disclosed in U.S. Pat. No. 4,625,012, incorporated herein by reference. If desired, a standard polyurethane catalyst such as those disclosed in U.S. Pat. No. 4,625,012 at column 5, lines 14 to 23, may be added. The reaction of the isocyanato silane with a polyol can take place at a temperature of about 0° C. or greater, more preferably about 25° C. or greater, and preferably about 150° C. or less and most preferably about 80° C. or less. This reaction is preferably performed under an inert atmosphere. The reaction is allowed to proceed until the desired silane functionality is achieved.

In another embodiment, the polymer may be a polyurethane based backbone having hydrolyzable silane groups. Such materials are disclosed in Chang, U.S. Pat. No. 4,622, 369 and Pohl, U.S. Pat. No. 4,645,816, relevant portions incorporated herein by reference.

In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be, added to the polymer at the point of unsaturation by a hydrosilylation reaction. This reaction is described in Kawakubo, U.S. Pat. No. 4,788,254, column 12, lines 38 to 61; U.S. Pat. Nos. 3,971,751; 5,223,597;

4,923,927; 5,409,995 and 5,567,833, incorporated herein by reference. The polymer prepared can be crosslinked in the presence of a hydrosilylation crosslinking agent and hydrosilylation catalyst as described in U.S. Pat. No. 5,567,833 at column 17, lines 31 to 57, and U.S. Pat. No. 5,409,995, incorporated herein by reference.

The preferred siloxy functional polymers are trialkoxysilane functional polyethers or polyurethanes wherein the polyether or polyurethane backbone has a number average molecular weight of about 6,000 or greater or a dialkoxysilane functional polymer having a polyether or polyurethane backbone. Preferably, the trialkoxysilane functional polymer having a polyether or polyurethane backbone has a weight average molecular weight of about 10,000 or greater and more preferably about 12,000 or greater. Preferably, the polyether or polyurethane backbone has a number average molecular weight of 20,000 or less and most preferably 16,000 or less.

The prepolymer is present in the adhesive composition in a sufficient amount such that the adhesive is capable of bonding glass or coated plastic to another substrate, such as metal, plastic, a composite or fiberglass. Preferably, the prepolymer is present in an amount of about 30 percent by weight or greater based on the weight of the adhesive, more preferably about 40 percent by weight or greater, even more preferably about 45 percent by weight or greater and most preferably about 50 percent by weight or greater. More preferably, the prepolymer is present in an amount of about 99:8 percent by weight or less based on the weight of the adhesive and most preferably about 85 percent by weight or less.

The adhesive composition containing siloxy functional groups further comprises one or more catalysts known to one skilled in the art which catalyzes the silanol condensation reaction. Preferred catalysts are tin catalysts which are well known in the art, see U.S. 2002/0100550, paragraph [0042] incorporated herein by reference. The amount of catalyst in the adhesive formulation is preferably about 0.01 percent by weight or greater, more preferably about 0.1 percent by weight or greater, and most preferably about 0.2 percent by weight or greater, and preferably about 5 percent by weight or less, even more preferably about 1.0 percent by weight or less, even more preferably 0.5 percent by weight or less and most preferably about 0.4 percent by weight or less. The adhesive composition may further comprise a curing agent for the siloxy moiety such as a hydrolyzable silicon compound as described in U.S. Publication 2002/0100550, paragraphs [43-47]. The hydrolyzable, silicon compound is used in an amount of from about 0.01 to about 20 parts by weight, and preferably from about 0.1 to about 10 parts by weight, per 100 parts by weight of the flexible polymer having a reactive silicon group and capable of crosslinking on siloxane bond formation. If it exceeds about 20 parts by weight, the elastosmeric properties after curing are adversely affected. Further examples of such hydrolyzable silicone compounds capable of crosslinking the silicone reactive polymer are disclosed in U.S. Pat. No. 5,541,266, incorporated herein by reference. Other such potential additives include organic silicone compounds B as disclosed in U.S. Pat. No. 4,837,274, see column 7, line 12 to column 9, line 15, incorporated herein by reference.

The polyisocyanate functional adhesives useful in the invention generally comprise a prepolymer having isocyanate functionality, a catalyst for the cure of the prepolymer and other additives well known to those skilled in the art. The prepolymers used in the invention can be conventional prepolymers used in polyurethane adhesive compositions. In a preferred embodiment the prepolymers are blended with a compound or polymer having silane functionality. In another preferred embodiment the prepolymer contains silane functionality as well as isocyanate functionality. A urethane prepolymer having silane functionality may be used as the entire prepolymer used in the adhesive or it may be blended with a prepolymer which does not have silane functionality.

Preferable urethane prepolymers for use in preparing the adhesives used in the invention include any compound having an average isocyanate functionality of at least about 2.0 and a molecular weight of at least about 2,000. Preferably, the average isocyanate functionality of the prepolymer is at least about 2.2, and is more preferably at least about 2.4. Preferably, the isocyanate functionality is no greater than about 4.0, more preferably no greater than about 3.5 and most preferably no greater than about 3.0. Preferably, the weight average molecular weight of the prepolymer is at least about 2,500, and is more preferably at least about 3,000; and is preferably no greater than about 40,000, even more preferably no greater than about 20,000, more preferably, no greater than about 15,000 and is most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer. See Hsieh et al., U.S. Pat. No. 5,852,137, column 4, line 65 to column 5, line 7, incorporated herein by reference. Suitable polyisocyanates for use in preparing the prepolymer are disclosed in Hsieh et al., U.S. Pat. No. 5,852,137 at column 2, line 40 to column 3, line 45, incorporated herein by reference. The isocyanate content in the prepolymers is preferably in the range of about 0.1 percent to, about 10 percent, more preferably in the range of about 1.0 percent to about 5.0 percent and most preferably in the range of about 1.5 percent to about 3.0 percent.

The isocyanate functional prepolymer is present in the adhesive composition in sufficient amount such that the adhesive is capable of bonding glass or coated plastic to the desired substrate such as metal, plastic, fiberglass or composites. Preferably, the isocyanate functional prepolymer is present in an amount of about 20 parts by weight or greater based on the weight of the adhesive composition, more preferably about 30 parts by weight or greater and most preferably about 40 parts by weight or greater. Preferably, the isocyanate functional prepolymer is present in an amount of about 99.8 parts by weight or less based on the weight of the adhesive composition, more preferably about 98 parts by weight or less and most preferably about 85 parts by weight or less.

In many embodiments it is desirable to have a silane present in some form. Preferable methods of including silane functionality in the adhesive formulations are disclosed in Wu et al., U.S. Pat. No. 6,512,033 at column 5, line 38 to column 7, line 27; U.S. Pat. No. 5,623,044; U.S. Pat. No. 4,374,237; U.S. Pat. No. 4,345,053 and U.S. Pat. No. 4,625,012, relevant portions incorporated herein by reference. The amount of silane present is that amount which enhances the adhesion of the adhesive to the substrate surface. The amount of silane present is preferably about 0.1 parts by weight or greater based on the weight of the adhesive and most preferably about 0.5 parts by weight or greater. The amount of silane used is preferably about 10 parts by weight or less and most preferably about 2.0 parts by weight or less.

The adhesive also contains a catalyst which catalyzes the reaction of isocyanate moieties with water or an active hydrogen containing compound. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. Included in the useful organotin catalysts are compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^1OC(O))_2$—Sn—$(R^1)_2$ wherein $R^1$ is independently in each occurrence a $C_{1-10}$ alkyl, preferably a $C_{1-3}$ alkyl and most preferably a methyl. Dialkyltin dicarboxylates with lower total carbon atoms are preferred as they are more active catalysts in the compositions used in the invention. The preferred dialkyl dicarboxylates include 1,1-dimethyltin dilaurate, 1,1-dibutyltin diacetate and 1,1-dimethyl dimaleate. The organotin catalyst is present in an amount of about 60 parts, per million or greater based on the weight of the adhesive more preferably 120 parts by million or greater. The organotin catalyst is present in an amount of about 1.0 part by weight or less based on the weight of the adhesive, more preferably about 0.5 parts by weight or less and most preferably about 0.1 parts by weight or less.

Among preferred tertiary amines are dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, and mixtures thereof; and metal alkanoates, such as bismuth octoate or bismuth neodecanoate and the like. More preferred tertiary amine is dimorpholinodiethyl ether or (di-(2-(3,5-dimethyl-morpholino)ethyl) ether). Tertiary amines are preferably employed in an amount, based on the weight of the adhesive, of about 0.01 parts by weight or greater based on the adhesive, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less, and most preferably about 0.4 parts by weight or less.

The adhesive composition may further comprise a stabilizing amount of an organophosphite. The organophosphite is preferably present in a sufficient amount to enhance the durability of bond of the adhesive composition to the substrate surface. Preferably at least one of the phosphorous atoms is bonded to an oxygen atom which is bonded to an aromatic moiety, such as a phenyl. Preferably, at least one of the phosphorous atoms is bonded to an oxygen atom bonded to an alkyl moiety. Preferably, at least one of the phosphorous atoms is bonded to both an aromatic moiety and an alkyl moiety through oxygen moieties. The organophosphites preferred for use in this invention are phosphites wherein the ligands on the phosphite comprise one ligand with at least one aliphatic moiety and one ligand with at least one aromatic moiety or comprises at least one ligand having both aromatic and aliphatic structures; i.e., alkaryl. Ligand as used in this context refers to the groups bound to the oxygens bound to the phosphorous atoms of the phosphite. In a preferred embodiment, the phosphite corresponds to the formula

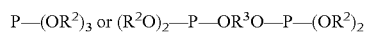

Preferably $R^2$ is independently in each occurrence $C_{6-18}$ alkyl, $C_{7-30}$ alkaryl or $C_{6-20}$ aryl; more preferably $C_{6-12}$ alkyl and most preferably $C_{9-12}$ alkyl. Preferably $R^3$ is independently in each occurrence $C_{6-18}$ alkylene, $C_{7-30}$ alkarylene, or $C_{6-20}$ arylene; more preferably $C_{7-30}$ alkarylene, or $C_{6-20}$ arylene; even more preferably $C_{7-30}$ alkarylene and most preferably a divalent bisphenyl structure, for instance 1,3 propylene diphenyl or methylene diphenyl. Preferably, the divalent bisphenyl is based on bisphenol A or bisphenol F. As used herein "alkyl" means saturated straight or branched carbon chain.

Among preferred organophosphites are poly(dipropyleneglycol) phenyl phosphite (available from Dover Chemical Corporation under the trademark and designation DOVERPHOS 12), tetrakis isodecyl 4,4' isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the organophosphite is present in the adhesive in an amount of about 0.1 percent by weight or greater and more preferably about 0.2 percent by weight or greater. Preferably, the organophosphite is present in the adhesive in an amount of about 1.0 percent by weight or less and more preferably about 0.5 percent by weight or less.

In a preferred embodiment, the adhesive includes a light stabilizer. Any light stabilizer which facilitates the system maintaining a durable bond to the substrate for a significant portion of the life of the structure to which it is bonded may be used. Preferred light stabilizers are hindered amine light stabilizers. Hindered amine light stabilizers generally comprise include those available from Ciba. Geigy such as TINUVIN™ 144, n-butyl-(3,5-di-ter-butyl-4-hydroxybenzyl)bis-(1,2,2,6-pentamethyl-4-piperidinyl) malonate; TINUVIN™ 622, dimethyl succinate polymer with 4-hydroxy-2,2,6,6,-tetramethyl-1-piperidine ethanol; TINUVIN™ 77, bis(2,2,6, 6,-tetramethyl-4-piperidinyl) sebacate; TINUVIN™ 123, bis-(1-octyloxy-2,2,6,6, tetramethyl-4-piperidinyl) sebacate, TINUVIN™ 765, bis(1,2,2,6,6,-pentamethyl-4-piperidinyl) sebacate; CHIMASSORB™ 944 poly[[6-[1,1,3,3-tetramethyl-butyl)amino]-1,3,5-triazine-2,4-diyl][(2,2,6,6-tetramethyl-4-piperidinyl)imino]-1,6-hexanediyl[(2,2,6-tetramethyl-4-piperidinyl)imino]]) and available from Cytec; CYASORB™ UV-500, 1,5-dioxaspiro(5,5) undecane 3,3-dicarboxylic acid, bis(2,2,6,6,-tetramethyl-4-piperidinyl) ester; CYASORB™ UV-3581, 3-dodecyl-1-(2,2,6,6,-tetramethyl-4-piperidyl-pyrrolidin-2,5-dione) and CYASORB™ UV-3346, poly[((6-morpholino-s-triazine-2,4-diyl)[2,2,6,6-tetramethyl-4-piperidyl)imino]-hexamethylene [(2,2,6,6-tetramethyl-4-piperidyl) imino]]. More preferred hindered light amine stabilizers include TINUVIN™ 123 bis-(1-octyloxy-2,2,6,6, tetramethyl-4-piperidinyl) sebacate and TINUVIN™ 765 bis(1,2,2,6,6,-pentamethyl-4-piperidinyl) sebacate. A sufficient amount of light stabilizer to enhance the bond durability to the substrate may be used. Preferably, the light stabilizer is used in amount of about 0.1 parts by weight or greater, based on the weight of the adhesive composition or clear primer, more preferably about 0.2 parts by weight or greater and most preferably about 0.3 parts by weight or greater. Preferably, the amount of light stabilizer present is about 3 weight parts or less, based on the weight of the adhesive composition or clear primer, more preferably about 2 weight parts or less and most preferably about 1 weight parts or less.

The adhesive formulation may contain other additives commonly used in adhesive formulations as known to those skilled in the art. The adhesive formulation may be formulated with fillers known in the art for use in adhesive compositions. By the addition of such materials, physical properties such as viscosity, flow rates, sag and the like can be modified. However, to prevent premature hydrolysis of the moisture sensitive groups of the prepolymer, it is preferable to thoroughly dry the fillers before addition to the adhesive compositions.

Optional components of the adhesive useful the invention include reinforcing fillers. Such fillers are well known to those skilled in the art and include carbon black, titanium dioxide, calcium carbonate, surface treated silica, titanium oxide, fumed silica and talc. The reinforcing fillers are used in a sufficient amount to increase the strength of the adhesive and to provide thixotropic properties to the adhesive. Preferably, the reinforcing, filler is present in an amount of about 1 part by weight of the adhesive composition or greater, more preferably about 15 parts by weight or greater and most preferably about 20 parts by weight or greater. Preferably, the reinforcing filler is present in an amount of about 40 parts by weight of the adhesive composition or less, more preferably about 35 parts by weight or less and most preferably about 33 parts by weight or less.

Among optional materials in the adhesive compositions are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is the form of pulverized powder, spray dried beads or finely ground particles. Clays may be used in an amount of about 0 part by weight of the adhesive composition or greater, more preferably about 1 part by weight or greater and even more preferably about 6 parts by weight or greater. Preferably, the clays are used in an amount of about 20 parts by weight or less of the adhesive composition and more preferably about 10 parts by weight or less.

The adhesive compositions useful in this invention may further comprise plasticizers so as to modify the rheological properties to a desired consistency. Such materials are preferably free of water, inert to reactive groups and compatible with the polymer used in the adhesive. Suitable plasticizers are well known in the art and preferable plasticizers include alkyl phthalates such as dialkyl phthalate, wherein the alkyl phthalate is linear with mixed $C_7$, $C_9$ and $C_{11}$ alkyl groups, diisononyl phthalate, diisododecyl phthalate, dioctylphthalate or dibutylphthalate, partially hydrogenated terepene, commercially available as "HB-40", trioctyl phosphate, epoxy plasticizers, toluene-sulfamide, chloroparaffins, adipic acid esters, castor oil, toluene, xylene, n-methylpyrrolidone and alkylnaphthalenes. The amount of plasticizer in the adhesive composition is that amount which gives the desired rheological properties and which is sufficient to disperse the catalyst and other components in the system and to provide the desired viscosity. The amounts of plasticizer disclosed herein include those amounts added during preparation of the prepolymer and during compounding of the adhesive. Preferably, plasticizers are used in the adhesive composition in an amount of about 0 part by weight or greater based on the weight of the adhesive composition, more preferably about 5 parts by weight or greater, even more preferably about 10 parts by weight or greater and most preferably about 20 parts by weight or greater. The plasticizer is preferably used in an amount of about 45 parts by weight or less based on the total amount of the adhesive composition, more preferably about 40 parts by weight or less, even more preferably about 30 parts by weight or less and most preferably about 25 parts by weight or less.

The adhesive compositions useful in this invention may further comprise stabilizers which function to protect the adhesive composition from moisture, thereby inhibiting advancement and preventing premature crosslinking of the polymer capable of crosslinking in the adhesive formulation. Included among such stabilizers are hydrocarbyl alkoxysilanes, such as vinyl trimethoxysilane, diethylmalonate and alkylphenol alkylates. Such stabilizers, are preferably used in an amount of about 0.1 part by weight or greater based on the total weight of the adhesive composition, preferably about 0.5 part by weight or greater and more preferably about 0.8 part by weight or greater. Such stabilizers are used in an amount of about 5.0 parts by weight or less based on the weight of the adhesive composition, more preferably about 2.0 parts by weight or less and most preferably about 1.4 parts by weight or less.

The adhesive compositions used in the invention may further comprise an adhesion promoter known to those skilled in the art, such as those described in Mahdi et al., U.S. Pat. No. 6,828,403, col. 11, line 50 to col. 12, line 57 and Wu, U.S. Pat. No. 6,512,033 at col. 5 line 38 to col 6 and 7, line 35, both incorporated herein by reference. Preferable adhesion promoters are the amino alkoxy silanes, vinyl alkoxy slanes, isocyanato alkoxy silanes and isocyanurate functional alkoxy silanes. More preferred of the additional adhesion promoters include gamma-glycidoxypropyltrimethoxy silane, gamma-isocyanato-propyltrimethoxy silane, n-phenyl-gamma-aminopropyltrimethoxysilane, gamma-isocyanatopropylmethyldimthoxy silane, gamma-isocyanatopropyltriethoxy silane, beta (3,4-epoxycyclohexyl)ethyltriethoxysilane, gamma-glycidoxypropylmethyl-dimethoxy silane, tris-(gamma-trimethoxysilylpropyl)isocyananurate, vinyltriethoxysilane, or vinyltrimethoxysilane. Such additional adhesion promoters are present in a sufficient amount to promote the adhesion of the adhesive to the glass or other substrate surface to the desired level usually determined by testing the lap shear strength and failure mode of the bond to the substrate. Preferably, the amount of adhesion promoter is about 10 parts by weight or less based on the weight of the adhesive; more preferably about 5 parts by weight or less and most preferably about 2 parts by weight or less. Preferably, the amount of adhesion promoter is about 0.01 part by weight or greater based on the weight of the adhesive; more preferably about 0.1 part by weight or greater and most preferably about 0.5 part by weight or greater.

The adhesive compositions can also contain heat stabilizers known in the art. Among preferred heat stabilizers are alkyl substituted phenols, phosphites, sebacates and cinnamates. Preferably, the amount of heat stabilizer is about 5 parts by weight or less based on the weight of the adhesive; more preferably about 2 parts by weight or less and most preferably about 1.0 part by weight or less. Preferably, the amount of heat stabilizer is about 0.01 part by weight or greater based on the weight of the adhesive; and most preferably about 0.5 part by weight or greater.

In another preferred embodiment, the adhesive compositions used may further comprise an ultraviolet light absorber. Any ultraviolet absorber which enhances the durability of the bond of the adhesive to the substrate may be used. Preferred UV light absorbers include benzophenones and benzotriazoles. More preferred UV light absorbers include those from Ciba Geigy such as TINUVIN™ P, 2-(2'-hydroxy-5'-methylphenyl)-benzotriazole; TINUVIN™ 326, 2-(5-chloro-2H-benzotriazol-2-yl)-6-(1,1-dimethylethyl)-4-methylphenol; TINUVIN™ 213 poly(oxy-1,2-ethanediyl), (α,(3-(3-(2H-benzotriazol-2-yl)-5-(1,1-dimethylethyl)-4-hydroxyphenyl)-1-oxopropyl)-ω-hydroxy; poly(oxy-1,2-ethanediyl), (α, (3-(3-(2H-benzotriazol-2-yl)-5-(1,1-dimethylethyl)-4-hydroxyphenyl)-1-oxopropyl)-ω-(α,(3-(3-(2H-benzotriazol-2-yl)-5-(1,1-dimethylethyl)-4-hydroxyphenyl)-1-oxopropyl); TINUVIN™327, 2-(3,5-ditert-butyl-2-hydroxyphenol)-5-chlorobenzotriazole; TINUVIN™ 571, 2-(2H-benzotriazol-2-yl)-6-dodecyl-4-methylphenol, branched and linear; TINUVIN™ 328, 2-(2H-benzotriazol-2-yl)-4,6-bis(1,1-dimethylpropyl)phenol and from Cytec such as CYASORB™ UV-9,2-hydroxy-4-methoxybenzophenone; CYASORB™ UV-24, 2,2'-dihydroxy-4-methoxybenzophenone; CYASORB™ UV-1164, [4,6-bis(2, 4-dimethylphenyl)-1,3,5-triazin-2-yl]-5-(octyloxy) phenol; CYASORB™ UV-2337, 2-(2'-hydroxy-3'-5'-di-t-amylphenyl) benzotriazole; CYASORB™ UV-2908, 3,5-di-t-butyl-4-hydroxybenzoic acid, hexadecyl ester; CYASORB™ UV-5337, 2-(2'-hydroxy-3',5'-di-t-butylphenyl)-5-chlorobenzotriazole; CYASORB™ UV-531, 2-hydroxy-4-n-octoxybenzophenone; and CYASORB™ UV-3638, 2,2-(1,4-phenylene)bis[4H-3,1-benzoxazin-4-one]. More preferred UV light absorbers include CYASORB™ UV-531, 2-hydroxy-4-n-octoxybenzophenone and TINUVIN™ 571 2-(2H-benzotriazol-2-yl)-6-dodecyl-4-methylphenol, branched and linear. Preferably, the UV light absorber is used in a sufficient amount to enhance the durability of the bond of the adhesive to the substrate. Preferably, the UV absorber is used in an amount of about 0.1 parts by weight or greater, based on the weight of the adhesive composition, more preferably about 0.2 weight parts or greater and most preferably about 0.3 parts by weight or greater. Preferably, the UV light inhibitor is used in an amount of about 3 parts by weight or less based on the weight of the adhesive composition, more preferably about 2 parts by weight or less and most preferably about 1 parts by weight or less.

For formulating adhesive compositions, the one or more prepolymers and the silane containing compound, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith.

Other components commonly used in adhesive compositions may be used in the adhesive composition used in this invention. Such materials are well known to those skilled in the art and may include antioxidants.

In general, the method of bonding glass or coated plastic, such as a window, to a substrate comprises, applying an adhesive to the surface of the glass or coated plastic along the portion of the glass or coated plastic which is to be bonded to the structure which has the composition of this invention coated thereon. The adhesive is thereafter contacted with the second substrate such that the adhesive is disposed between the glass or coated plastic and the second substrate. The adhesive is allowed to cure to form a durable bond between the glass or coated plastic and the substrate. In a preferred embodiment, one substrate is glass or coated plastic with an abrasion resistant coating (coated plastic) and the other substrate is a plastic, metal, fiberglass or composite substrate (for instance cured sheet molding compound) which may optionally be painted. This method is especially effective for substrates painted with an acid resistant paint. Generally, the adhesives are applied at ambient temperature in the presence of atmospheric moisture. Exposure to atmospheric moisture is sufficient to result in curing of the adhesive. Curing may be further accelerated by applying heat to the curing adhesive by means of convection heat or microwave heating. The coated plastic with an abrasion resistant coating can be any plastic which is clear, such as polycarbonate, acrylics, hydrogenated polystyrene or hydrogenated styrene conjugated diene block copolymers having greater than 50 percent styrene content. The abrasion resistant coating can comprise any coating which is abrasion resistant, such as a polysiloxane coating. Preferably, the coating has an ultraviolet pigmented light blocking additive.

In another embodiment of the invention a clear composition according to this invention can be used as a clear abrasion resistant coating on a clear plastic substrate. Such coating should not contain a pigment which introduces opacity to the coating when cured. Thus, the clear plastic substrate with a cured coating of the invention can be used as a window in a structure. The coating provides abrasion resistance to the clear plastic. The clear coating can contain a known ultraviolet light blocking additive. A coating according to the invention containing a pigment which introduces opacity can thereafter be applied to the surface of the coated plastic window about the periphery of the window.

In another embodiment, the adhesive can be a cure-on-demand adhesive comprising a flexible backbone having functional groups and which further comprises an encapsulated curing agent for the adhesive. Such an adhesive is disclosed in U.S. Pat. No. 6,355,127, relevant portions incorporated herein by reference. The cure-on-demand adhesive can be applied at a time and place remote from installation of the window into the structure. Typically, the adhesive just prior to contacting the window with the structure is exposed to conditions which cause the release of the encapsulated curing agent to begin curing of the adhesive. This is typically done by exposing the adhesive to heat which melts the encapsulating agent and releases the curing agent, thereby beginning the cure of the adhesive. In another embodiment, the adhesive can be a slow curing polyurethane adhesive containing crystalline polyester. Such adhesive is heated prior to contacting the window with the structure into which it is bonded so as to give the adhesive hot melt properties and to provide rapid green strength upon cooling. Such an adhesive can be shipped from a remote location to the location wherein the window would be contacted with the structure.

Figure 3:
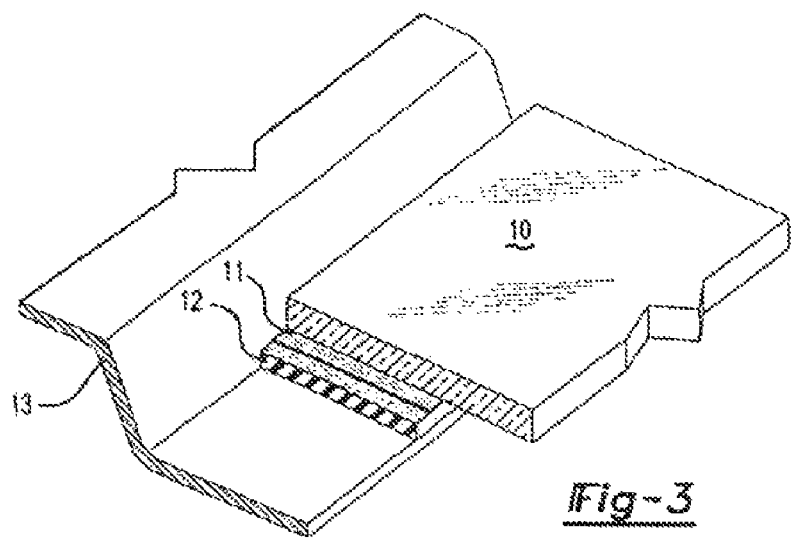
FIG. 3 shows a cross-sectional view of a window frame, window, window coating and adhesive.
Figure 4:
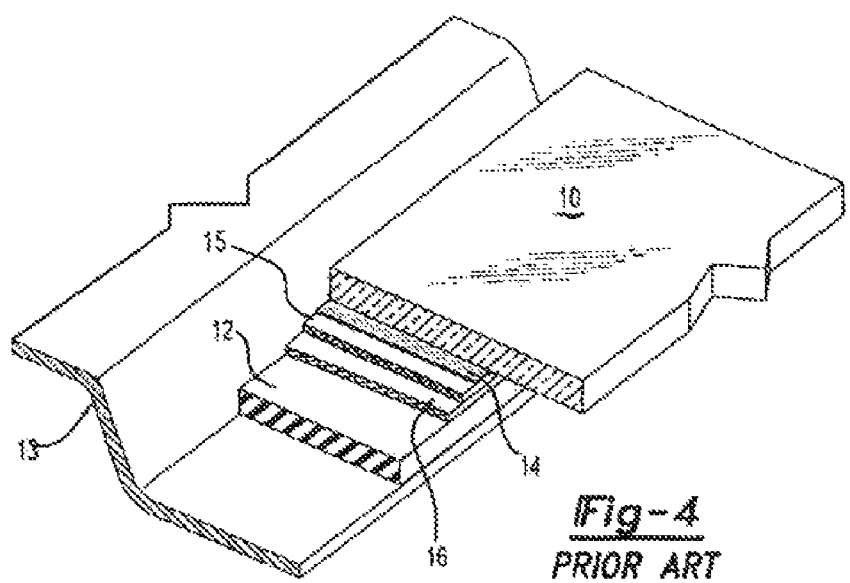
FIG. 4 illustrates the prior art with respect to a window frame, window frame, window coating and adhesive.

In another embodiment, the invention is a structure with glass or abrasion resistant coated plastic having a cured coating composition of the invention deposited thereon bonded by an adhesive to the structure. The glass or coated plastic is preferably a window and the structure is preferably an automobile, or building. FIG. 3 illustrates a stepped cross section of the bond between the structure and the window. The figure shows the glass (10) and the organic frit (11). Located adjacent to the organic frit (11) is the adhesive (12) and the flange of the structure (13) to which it is bonded. FIG. 4 shows a cross section of the prior art bonding method. The glass (10), a ceramic enamel frit (14), clear primer layer (15), a black-out primer layer (16), the adhesive (12) and the flange (13) of the structure as shown.

Figure 5:
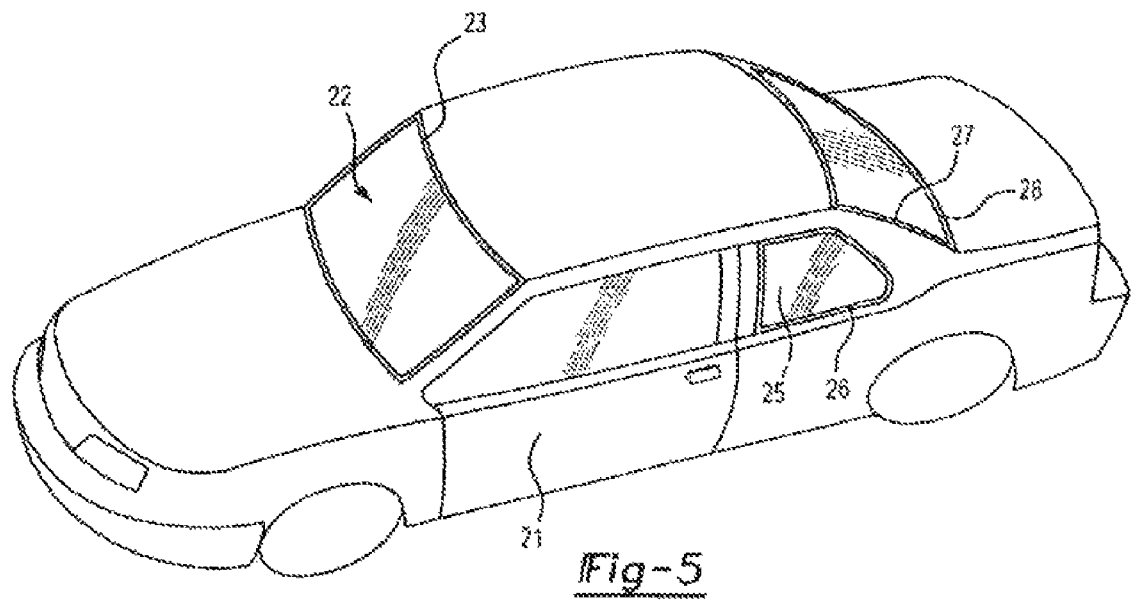
FIG. 5 illustrates where the compositions of the invention are used on an automobile.

In another embodiment, the structure is an automobile. FIG. 5 illustrates an automobile having glass bonded into the automobile. The automobile (21) is shown having a windshield (22) with a frit (23) around the periphery. Also, shown is a bonded in quarter glass (25) having a frit (26) disposed around the periphery of the quarter glass. Also, illustrated is a back light (27) having a frit located (28) around the back light (27).

Generally, the window is placed in the structure by the following process. The process starts with a window having a coating of the composition of the glass disposed on the periphery of the window wherein the composition is cured. Such a window has the coating of the invention around the periphery of the window with an adhesive bead as described herein as applied around the periphery of the window on the coating. The window with the adhesive deposited thereon is contacted with a window flange with the adhesive located between the window and the structure. The adhesive is allowed to cure. In vehicles, quarter glass, windshields, back lights and sunroofs may be bonded in using the coatings and system of the invention.

In reference to polyurethane prepolymers, average isocyanate functionality and molecular weight are determined according to Wu, U.S. Pat. No. 6,512,033 at column 11, lines 3 to 29 and Bhat, U.S. Pat. No. 5,922,809 at column 12, lines 65 to column 13, line 26, incorporated herein by reference.

The compositions of the invention can be used to repair defective or damaged coatings or frits. The coatings can be organic, inorganic or a mixture thereof. The compositions of the invention, can be applied to the damaged or defective portion of the coating and exposed to curing conditions. For instance, a damaged ceramic enamel about the periphery of a window can be repaired using the coatings of the invention. The color of the repaired coating can be matched by the compositions of the invention.

The compositions can be used in any application which calls for a coating on glass or a clear plastic; for instance, buildings transportation vehicles, furniture, appliances, containers (beverages, household products, etc) and the like.

Parts by weight as used herein refers to compositions containing 100 parts by weight.

Specific Embodiments of Invention

The following examples are included for illustrative purposes only and are not intended to limit the scope of the invention. Unless otherwise stated, all parts and percentages are by weight.

Examples 1-9

Several coating formulations of the invention were made as described hereinafter.

The following components were added to a Max 60 cup and speed mixed for 30 minutes to insure that inhibitor and dispersant are fully dissolved, and to wet out the pigments and fillers with resin.

TABLE 1

| | Examples | | | | | |
|---|---|---|---|---|---|---|
| component | 1 to 7 Grams | 1 to 7 Wt. Percent | 8 Grams | 8 Wt. Percent | 9 Grams | 9 Wt. Percent |
| isobornyl acrylate | 24.600 | 16.400 | 11.480 | 16.4 | 11.165 | 15.950 |

TABLE 1-continued

| | Examples | | | | | |
|---|---|---|---|---|---|---|
| component | 1 to 7 Grams | 1 to 7 Wt. Percent | 8 Grams | 8 Wt. Percent | 9 Grams | 9 Wt. Percent |
| tripropylene glycol diacrylate | 12.225 | 8.150 | 5.705 | 8.150 | 5.705 | 8.150 |
| acrylic acid | 8.940 | 5.960 | 4.172 | 5.960 | 4.172 | 5.960 |
| acrylated polysiloxane[1] | 0.600 | 0.400 | 0.280 | 0.400 | 0.280 | 0.400 |
| inhibitor[2] | 0.750 | 0.500 | 0.350 | 0.500 | 0.350 | 0.500 |
| dispersant[3] | 0.675 | 0.450 | | | 0.630 | 0.900 |
| urethane acrylate[4] | 42.960 | 28.640 | 20.048 | 28.60 | 20.048 | 28.640 |
| carbon black[5] | 6.750 | 4.500 | 3.150 | 4.500 | 3.150 | 4.500 |
| alumina[6] | 52.500 | 35.000 | 24.500 | 35.000 | 24.500 | 35.000 |
| Total | 150.000 | 100.000 | 70.000 | 100.00 | 70.000 | 100.00 |

[1]TEGO RAD™ 2100 acrylated polysiloxane additive available from Tego Chemie (Degussa).
[2]ADDITIVE™ 01-468 free radical polymerization inhibitor from Rahn.
[3]SOLSPERSE™ 32000 polymeric amide hyperdispersant from Avecia.
[4]CN™ 985B88 urethane acrylate from Sartomer, blend of aliphatic urethane acrylate, triacrylate monomer and hexanediol acrylate.
[5]MOGUL™ E carbon black from Cabot.
[6]RC-LS DBM alpha alumina powder from Baikowski-Malakoff.

After speed mixing, the formulation and 8 mm magnesia-stabilized zirconia milling media was added to an 8 oz. (237 ml) plastic NALGENE™ milling bottle. The mixture was ball milled for 24 hours. The milling media was added so it only covers ⅓ to ½ of the formulation. The mixture was ball milled for 24 hours. After ball milling, the additional components were added, as shown below.

TABLE 2

| | Example | | | | | | | |
|---|---|---|---|---|---|---|---|---|
| component | 1, 6 Grams | 1, 6 Wt. Percent | 2-5, 7 Grams | 2-5, 7 Wt. Percent | 8 Grams | 8 Wt. Percent | 9 Grams | 9 Wt. Percent |
| ball-milled formulations | 15 | 86.21 | 14.6505 | 84.20 | 15 | 86.21 | 10 | 86.21 |
| photoinitiator | 0.9 | 5.17 | 0.9 | 5.17 | 0.9 | 5.17 | 0.6 | 5.17 |
| adhesion promoter | 1.5 | 8.62 | 1.5 | 8.62 | 1.5 | 8.62 | 1 | 8.62 |
| additives Ex 2-5 and 7 | | — | 0.3495 | 2.01 | — | — | — | — |
| Total | 17.4 | 100.0 | 17.4 | 100.00 | 17.4 | 100.00 | 11.6 | 100.00 |

The components added in Table 2 were added in the following sequence. The photoinitiator, IRGACURE™ 379 alpha amino ketone photoinitiator available from Ciba Geigy, was added and the mixture was mixed on a stir plate for at least one hour. The adhesion promoter, SILQUEST™ A1170 adhesion promoter (Bis-(3-trimethoxysilylpropyl) amine) available from GE Silicones, was then added and the mixture was mixed on a stir plate for at least one hour. Then the specific additives for each of Examples 2 to 5 and 7 were added and the mixture was mixed of a stir plate for at least 1 hour. The additives were for Example 2 SILQUEST™ A-Link 35 propyl trimethoxy isocyanatosilane; for Example 3 KARENZ™ MOI isocyanate ethyl methacrylate from Kowa/San Esters; for Example 4 TYZOR™ TnBT titanate from DuPont; for Example 5 tetraethyl orthosilicate; and Example 7 TINUVIN™ 123 hindered amine light stabilizer from Ciba. In Example 6, IRGACURE™ 379 photoinitiator is replaced with SPEEDCURE™ 3040 proprietary blend photoinitiator available from Lambson/Aceto Corporation.

The coatings were applied on the tin-side of glass with number 15 drawdown rod and UV cured with a 600 W/inch Fusion D bulb, 1.5 inch (3.8 cm) lamp-to-part distance (LPD), 10 fpm, 1 pass. Tin-side of glass is the side that shines blue underneath a fluorescent UV lamp.

The samples were tested with three different adhesive formulations BETASEAL™15625 isocyanate functional adhesive (hereinafter Adhesive 1), BETASEAL™ 15630 isocyanate and silane functional adhesive (hereinafter Adhesive 2) and BETASEAL™ 61355 isocyanate functional adhesive (hereinafter Adhesive 3). The samples were prepared according to the QKA test described below. After application of the adhesive, the coated glass panels with adhesive applied thereto were exposed to different environment conditions before performing the QKA test. The conditions of exposure are described for the adhesive after cure for 7 days at 23° C. and 50 percent relative humidity (RH) (Condition 1); 14 days at 90° C. (Condition 2); 4 weeks at 90° C. (Condition 3); 14 days at 38° C. and 100 percent RH (Condition 4); 4 weeks at 38° C. and 100 percent RH (Condition 5); 7 days cure at 23° C. and 50 percent RH and then 1 day, 2 days, 5 days and 6 days (Condition 6) in a 90° C. water bath; coated samples (no adhesive) were heated at 90° C. for 31 days of exposure to at 90° C. water bath for 30 days (Condition 7); exposure at 30° C. at 80 percent RH for 30 days (Condition 8) and then 1 to 5 days exposure in a 90° C. water bath (Condition 9). The samples were also exposed to 1,000 hours (Condition 10) and 2,000 hour Weatherometer conditions (Condition 11) after 7 days cure at 23° C. and 50 percent RH. The results are compiled in Table 3. CF means cohesive failure and the adhesive bead was torn through the bead. AF means adhesive failure where the bond between the adhesive and substrate broke, the adhesive peeled off the surface. In Table 2, the percentages listed refer to the percent delamination of the coating.

TABLE 3

| Condition | Adhesive | 1 | 2 | 3 | 4 | 5 | 6 | 7 | 8 | 9 |
|---|---|---|---|---|---|---|---|---|---|---|
| 1 | 1 | 100CF | 100CF | 100CF | 100CF | 100CF | 100CF | 100CF | 100CF | 100CF |
| 1 | 2 | 100CF | 100CF | 100CF | 100CF | 100CF | 100CF | 100CF | 100CF | 100CF |
| 1 | 3 | 100CF | 100CF | 100CF | 100CF | 100CF | 100CF | 100CF | 100CF | 100CF |
| 2 | 1 | 100CF | 100CF | 100CF | 100CF | 100CF | 100CF | 100CF | 100CF | 100CF |
| 2 | 2 | 100CF | 100CF | 100CF | 100CF | 100CF | 100CF | 100CF | 100CF | 100CF |
| 2 | 3 | 100CF | 100CF | 100CF | 100CF | 100CF | 100CF | 100CF | 100CF | 100CF |
| 3 | 1 | 100CF | 100CF | 100CF | 100CF | 100CF | 100CF | 100CF | 100CF | 100CF |
| 3 | 2 | 100CF | 100CF | 100CF | 100CF | 100CF | 100CF | 100CF | 100CF | 100CF |
| 3 | 3 | 100CF | 100CF | 100CF | 100CF | 100CF | 100CF | 100CF | 100CF | 100CF |
| 4 | 1 | 100CF | 100CF | 0CF | 0CF | 0CF | 100CF | 0CF | 100CF | 100CF |
| 4 | 2 | 100CF | 100CF | 100CF | 100CF | 100CF | 100CF | 100CF | 100CF | 100CF |
| 4 | 3 | 100CF | 100CF | 100CF | 100CF | 100CF | 100CF | 100CF | 100CF | 100CF |
| 5 | 1 | 0CF | 0CF | 0CF | 0CF | 0CF | 100CF | 0CF | 0CF | 100CF |
| 5 | 2 | 100CF | 100CF | 100CF | 50CF | 100CF | 100CF | 100CF | 100CF | 100CF |
| 5 | 3 | 100CF | 100CF | 100CF | 100CF | 100CF | 100CF | 100CF | 100CF | 100CF |
| 6, 1 day | 1 | 20-30CF | 100CF | 100CF | 70CF, 30PF | 100CF | 100CF | 0CF | 80CF, 20AF | 100CF |
| 6, 1 day | 2 | 100CF | 100CF | 100CF | 90CF, 10PF | 100CF | 100CF | 0CF | 100CF | 100CF |
| 6, 1 day | 3 | 100CF | 100CF | 100CF | 90CF, 10PF | 100CF | 100CF | 0CF | 100CF | 100CF |
| 6, 2 days | 1 | 0CF | 0CF | 0CF | 0CF | 0CF | 70-80CF | | 0CF | 0CF |
| 6, 2 days | 2 | 100CF | 100CF | 100CF | 90CF, 10PF | 100CF | 100CF | | 100CF | 100CF |
| 6, 2 days | 3 | 100CF | 100CF | 100CF | 50CF, 50PF | 100CF | 100CF | | 100CF | 100CF |
| 6, 5 days | 1 | | | | | | 0CF | | | |
| 6, 5 days | 2 | 90CF, 10AF | 100CF | Coating peeled off | 90CF, 10PF | 100CF | 100CF | | 100CF | 20CF |
| 6, 5 days | 3 | 90CF, 10AF | 100CF | Coating peeled off | 50CF, 50PF | 100CF | 100CF | | 100CF | 100CF |
| 6, 6 days | 1 | | | | | | | | | |
| 6, 6 days | 2 | 90CF, 10AF | 90CF, 10AF | | 100CF | 90CF | 100CF | | 100CF | 0CF |
| 6, 6 days | 3 | 90CF, 10AF | 90CF, 10AF | | 100CF | 90CF | 100CF | | 100CF | 0CF |
| 7, 2 days | none | Coating ok | Coating ok | Coating ok | Coating ok | Coating ok | Coating ok | Coating ok | Coating ok | Coating ok |
| 7, 3 days | none | Coating ok | Coating ok | | 5 percent | Coating ok | Coating ok | Coating ok | Coating ok | Coating ok |
| 7, 6 days | none | Coating ok | Coating ok | | 10 percent | Coating ok | 5 percent | Coating ok | Coating ok | 5 percent |
| 7, 7 days | none | 5 percent | Coating ok | | 15 percent | Coating ok | 5 percent | Coating ok | Coating ok | 15 percent |
| 7, 10 days | none | 5 percent | Coating ok | | 40 percent | 10 percent | 5 percent | Coating ok | Coating ok | 15 percent |

TABLE 3-continued

| Condition | Adhesive | 1 | 2 | 3 | 4 | 5 | 6 | 7 | 8 | 9 |
|---|---|---|---|---|---|---|---|---|---|---|
| 7, 13 days | none | 5 percent | 10 percent | | 100 percent | 10 percent | 5 percent | Coating ok | Coating ok | 50-60 percent |
| 7, 17 days | none | 5 percent | 15 percent | | | 10 percent | 5 percent | Coating ok | 5 percent | |
| 7, 20 days | none | 5 percent | 25 percent | | | 10 percent | 5 percent | Coating ok | 5 percent | |
| 7, 24 days | none | 5 percent | 50 percent | | | 10 percent | 5 percent | Coating ok | 5 percent | |
| 7, 27 days | none | 5 percent | | | | 10 percent | 5 percent | Coating ok | 5 percent | |
| 7, 34 | none | 5 percent | | | | 10 percent | 5 percent | Coating ok | 5 percent | |
| 8 | 1 | 100CF | 100CF | 100CF | 100CF | 100CF | 100CF | 100CF | 100CF | 100CF |
| 8 | 2 | 100CF | 100CF | 100CF | 100CF | 100CF | 100CF | 100CF | 100CF | 100CF |
| 8 | 3 | 100CF | 100CF | 100CF | 100CF | 100CF | 100CF | 100CF | 100CF | 100CF |
| 9, 1 day | 1 | 30CF, 70AF | 100CF | 20CF | 50CF, 50PF | 40CF, 60AF | 100CF | 0CF | 30CF, 70AF | 100CF |
| 9, 1 day | 2 | 100CF | 100CF | 100CF | 100CF | 100CF | 100CF | 0CF | 100CF | 100CF |
| 9, 1 day | 3 | 100CF | 100CF | 100CF | 100CF | 100CF | 100CF | 0CF | 100CF | 100CF |
| 9, 2 days | 1 | 0CF | 1@0CF, 1@80CF | 0CF | 30CF, 70PF | 0CF | 100CF | 0CF | 0CF | 90CF, 10AF |
| 9, 2 days | 2 | 100CF | 100CF | 100CF | 100CF | 100CF | 100CF | 0CF | 100CF | 100CF |
| 9, 2 days | 3 | 100CF | 100CF | 100CF | 100CF | 100CF | 100CF | 0CF | 100CF | 100CF |
| 9, 3 days | 1 | | 0CF | 100PF | 0CF | | 0CF | | 0CF | 0CF |
| 9, 3 days | 2 | 100CF | 100CF | 100PF | 100CF | 100CF | 100CF | | 100CF | 100CF |
| 9, 3 days | 3 | 100CF | 100CF | 100PF | 100CF | 100CF | 100CF | | 100CF | 100CF |
| 9, 4 days | 1 | | | | | | | | | |
| 9, 4 days | 2 | 100CF | 100CF | | 100CF | 100CF | 100CF | | 100CF | 80CF, 20PF |
| 9, 4 days | 3 | 100CF | 100CF | | 100CF | 100CF | 100CF | | 100CF | 60CF, 40PF |
| 9, 5 days | 1 | | | | | | | | | |
| 9, 5 days | 2 | | 100CF | 100CF | | 100CF | 100CF | | 100CF | 80CF, 20PF |
| 9, 5 days | 3 | | 100CF | 100CF | | 100CF | 100CF | | 100CF | 60CF, 40PF |
| 10 | 1 | 100CF | 100CF | 100CF | 100CF | 100CF | 100CF | 100CF | 0CF | |
| 10 | 2 | AF; 1@20CF, 80AF | 100CF | 100CF | 100CF | 100CF | 100CF | 100CF | 0CF | |
| 10 | 3 | 70AF; 1@50CF | 100CF | 100CF | 100CF | 100CF | 100CF | 100CF | 0CF | |
| 11 | 1 | 100CF | 0CF | 0CF | 100CF | 100CF | 1@80CF | 100CF | 0CF | 100PF |
| 11 | 2 | 100CF | 0CF | 1@10CF | 100PF | 100CF | 1@40CF, 1@0CF | 100CF | 0CF | 100PF |
| 11 | 3 | 100CF | 0CF | 100CF | 100CF | 100CF | 100CF | 100CF | 0CF | 100PF |

Quick Knife Adhesion (QKA) Test

In this test the adhesive/substrate interface is scored with a sharp knife as the adhesive is being pulled back. The results are listed as the percent of cohesive failure (failure within the urethane adhesive) with the desired result being 100 percent CF (cohesive failure). The alternative failure mode is adhesive failure which is failure of the bond of the adhesive to the surface of the substrate.

Example 10

The following order of addition of the components was used: isobornyl acrylate (GENOMER™ 1121, Rahn); 12.70 g, tripropylene glycol diacrylate (TRPGDA™, UCB), 6.00 g, acrylic acid (from Acros Organics), 5.34 g, tetraethyl orthosilicate (SILBOND™ pure, SILBOND), 5.00 g, polyether modified polydimethylsiloxane (BYK™ UV 3510, BYK-Chemie), 0.36 g, polymerization inhibitor (ADDITIVE™ 01-468, Rahn), 0.50 g, polymeric dispersant (SOL-SPERSE™ 32000, Avecia), 2.20 g, and aliphatic urethane acrylate oligomer (CN™ 985B88, Sartomer), 21.10 g. The components were added to a "Max 60 Cup" from Flack Tek and then speed-mixed using a Hauschild Speed Mixer DAC 150 FVZ-K at 1000 to 1500 RPM for 4 minutes. The mixing process was repeated again for another 4 minutes to insure a homogeneous formulation. This homogeneous formulation was then poured into an 8 oz (237 ml) plastic NALGENE™ bottle, then carbon black pigment (MOGUL™ E, Cabot), 11.00 g and alumina (RC LS DBM, Baikowski-Malakoff), 32.02 g were added. The liquid resin formulation, carbon black, and alumina were stirred by hand with a wooden tongue depressor to wet out the pigments/fillers with the resin. Then 100 grams of cylindrical magnesia stabilized zirconia milling (grinding) media (diameter=88 mm, height=8 mm) was added to the NALGENE™ bottle. The NALGENE™ bottle containing all of the above-mentioned components was then placed on a roller-mill at a dial setting of 50 and milled overnight (12 to 20 hours) in order to break up any solid agglomerates and properly disperse the pigments/fillers in the liquid resin. After milling, 20 grams of the ball-milled formulation is added to a 1 oz (30 ml) glass bottle and then 0.4 g of an alpha hydroxy ketone photoinitiator (IRGACURE™ 184, Ciba), 0.8 g alpha amino ketone photoinitiator (IRGACURE™ 369, Ciba), and 0.1 g mono acyl phosphine oxide photoinitiator (LUCIRIN™ TPO, BASF), were added. The mixture was mixed on a magnetic stir plate with stir bar for at least 1 hour to dissolve the solid photoinitiators. Then 2 g of bis(3-trimethoxysilylpropyl)amine (SILQUEST™ A-1170, GE Silicones) was added. The mixture was mixed on a stir plate for about 1.5 hours. The resulting composition contains the listed components in the final weight percentages.

TABLE 4

| Component | Wt. Percent |
| --- | --- |
| isobornyl acrylate | 11.33 |
| tripropylene glycol diacrylate | 5.35 |
| acrylic acid | 4.76 |
| tetraethyl orthosilicate | 4.46 |
| polyether modified polydimethylsiloxane | 0.32 |
| polymerization inhibitor (ADDITIVE ™ 01-468, Rahn) | 0.45 |
| polymeric dispersant (SOLSPERSE ™ 32000, Avecia) | 1.96 |
| aliphatic urethane acrylate (CN ™ 985B88, Sartomer) | 18.82 |
| carbon black pigment (MOGUL ™ E, Cabot) | 9.81 |
| alumina (RC LS DBM, Baikowski-Malakoff) | 28.56 |
| alpha hydroxy ketone photoinitiator (IRGACURE ™ 184, Ciba) | 1.72 |
| alpha amino ketone photoinitiator (IRGACURE ™ 369, Ciba) | 3.43 |
| Mono acyl phosphine oxide photoinitiator (LUCIRIN ™ TPO, BASF) | 0.43 |
| Bis (3-trimethoxysilylpropyl)amine | 8.58 |

Soda lime float glass substrates from Cat-I Manufacturing (4 inches (10.2 cm)×4 inches (10.2 cm)×5 mm thick) were cleaned with an isopropanol-soaked cotton wipe to remove any surface contaminants prior to applying the coating. After cleaning the glass substrates, the coating composition was applied on the "tin-side" of the glass substrates using a number 10 wire wound rod to yield a dry film coating thickness of about 10 microns (0.01 mm). After a contact time of 1 minute, the coating was UV cured in air in less than 10 seconds with 1 pass at 10 feet (3 meters)/minute using a 600 W/inch (2.54 cm) Fusion D bulb (Fusion UV system) at a 1.5 inch (3.8 cm) lamp-to-part distance. Specific irradiance and dosage conditions were measured with a Power Puck radiometer from EIT, Inc.:

TABLE 5

| | |
| --- | --- |
| UVA Irradiance = 3730 mW/cm², UVA Dosage = 3835 mJ/cm² | UVA-320-390 nm |
| UVB Irradiance = 1136 mW/cm², UVB Dosage = 1161 mJ/cm² | UVB = 280-320 nm |
| UVC Irradiance = 67 mW/cm², UVC Dosage = 65 mJ/cm² | UVC = 250-260 nm |
| UVV Irradiance = 2319 mW/cm², UVV Dosage = 2352 mJ/cm² | UVV = 395-445 nm |

After UV curing, the coating is hard and scratch resistant.
Coating Testing

Twenty four hours after UV curing, coated glass samples were subjected to the following tests:
Micro-indentation used to determine universal hardness, Vickers hardness and modulus of coating; pencil hardness used to determine pencil hardness according to ASTM D3363; cross-hatch/tape peel adhesion test according to ASTM D3359 used to determine initial dry adhesion of coating, 100° C. boiling water immersion used to assess water resistance of coating, steel wool used to assess abrasion resistance of coating and light transmittance used to assess opacity of coating.

Results

Universal hardness=258.31 N/mm²

Vickers hardness—19.60

Modulus=10.02 GPa

Pencil hardness≧5H

Cross-hatch/tape peel adhesion=passes

100° C. boiling water immersion=no delamination after 6 days

Steel wool=slight scratching and burnishing

Light transmittance=0.31 percent

Examples 11-15

The components listed were added to a Max 100 cup and speed mixed for about 5 minutes to insure that inhibitor and dispersant are fully dissolved and then added carbon black to Max 100 cup.

TABLE 6

| Component | Grams | Wt. Percent |
| --- | --- | --- |
| isobornyl acrylate | 22.960 | 16.400 |
| tripropylene glycol diacrylate | 11.410 | 8.150 |
| acrylic acid | 8.344 | 5.960 |
| acrylated polysiloxane[1] | 0.560 | 0.400 |
| inhibitor[2] | 0.700 | 0.500 |
| dispersant[3] | 0.630 | 0.450 |
| urethane Acrylate[4] | 40.096 | 28.640 |
| carbon black[5] | 6.300 | 4.500 |
| alumina[6] | 49.000 | 35.000 |
| Total | 140.000 | 100.000 |

[1]TEGO RAD ™ 2100
[2]ADDITIVE ™ 01-468 inhibitor from Rahn
[3]SOLSPERSE ™ 32000 dispersant from Avecia
[4]CN ™ 985B88 from Sartomer
[5]MOGUL ™ E carbon black from Cabot
[6]RC-LS DBM ™ alumina (untreated)

The mixture was speed mixed in Max 60 cup to insure that carbon black was adequately dispersed. After speed-mixing, all of this formulation was added to an 8 oz (237 ml) plastic NALGENE™ milling bottle and added the following components to the NALGENE™ bottle. The formulation was ball milled for 24 hours.

For Examples 11 to 14, to the base formulation described above the listed components were added and mixing was performed as described with respect to Examples 1 to 9 except that after the addition of TINUVIN™ 123 and before addition of SILQUEST™ A-1170 the mixture was mixed on a stir plate for about 1 hour.

TABLE 7

| component | 11 Grams | 11 Wt. Percent | 12 | 12 | 13 | 13 | 14 | 14 |
|---|---|---|---|---|---|---|---|---|
| ball-milled formulations | 14.6505 | 84.20 | 15 | 86.21 | 14.65 | 84.20 | 14.48 | 83.2 |
| photoinitiator 1[7] | 0.9 | 5.17 | | | | | | |
| photoinitiator 2[8] | | | 0.9 | 5.17 | 0.9 | 5.17 | 0.9 | 5.17 |
| TINUVIN ™ 123 from Ciba | | | | | | | 0.17 | 1.0 |
| adhesion promoter[9] | 1.5 | 8.62 | 1.5 | 8.62 | 1.5 | 8.62 | 1.5 | 8.6 |
| | 0.3495 | 2.01 | | | 0.35 | | 0.35 | 2.0 |
| Total | 17.4 | 100.00 | 17.4 | 100.00 | 17.4 | 100.00 | 17.4 | 100 |

[7]IRGACURE ™ 379 Photoinitiator available from Ciba Geigy
[8]SPEEDCURE ™ 3040 photoinitiator from Aceto/Lambson
[9]SILQUEST ™ A-1170 adhesion promoter
[10]SILQUEST ™ A-Link 35 propyl trimethoxy isocyanatosilane
The coatings were applied to the tin-side of glass with number 15 DB rod and UV cured with D bulb, 1.5 inch (3.8 cm) LPD, 10 feet per minute (3 meters per minute), 1 pass.

Example 15

For Example 15, to the base formulation for Examples 11-14, was added the components described below and mixing was performed as described. The first 6 components were added to a Max 60 cup and speed-mixed for 30 minutes to insure that inhibitor and dispersant are fully dissolved and then carbon black was added to a Max 100 cup. The mixture was speed-mixed in a Max 60 cup to insure that carbon black is adequately dispersed. After speed-mixing, this formulation was added to an 8 oz (237 ml) plastic NALGENE™ milling bottle and the alumina was added to the NALGENE™ bottle. The mixture was ball milled for 24 hours.

TABLE 8

| Component | Grams | Wt. Percent |
|---|---|---|
| isobornyl acrylate | 13.120 | 16.400 |
| TPGDA tripropylene glycol diacrylate | 6.520 | 8.150 |
| acrylated polysiloxane [1] | 0.320 | 0.400 |
| inhibitor [2] | 0.400 | 0.500 |
| dispersant [3] | 0.360 | 0.450 |
| urethane acrylate [4] | 22.912 | 28.640 |
| carbon black [5] | 3.600 | 4.500 |
| alumina [6] | 28.000 | 35.000 |
| Total | 80.000 | 100.00 |

After ball-milling, the photoinitiators, silane and acrylic acid were post-added as listed below and processed as described in Examples 1 to 9.

TABLE 9

| Component | Grams | Wt. Percent |
|---|---|---|
| ball-milled formulations from above | 14.106 | 81.07 |
| photoinitiator [7] | 0.9 | 5.17 |
| adhesion promoter [9] | 1.5 | 8.62 |
| acrylic acid | 0.894 | 5.14 |
| Total | 17.4 | 100.00 |

The coatings were applied to the tin-side of glass with number 15 DB rod and UV cure with D bulb, 1.5 inch (3.8 cm) LPD, 10 fpm (3 Mpm), 1 pass.

Quick Knife Adhesion and weatherometer testing were performed as described in Examples 1-9. The results are compiled in Tables 10 and 11. Condition 12 is exposure of the adhesive to 90° C. in an oven for 30 days. Condition 13 is 30 days in an oven a 38° C. at 100 percent relative humidity.

TABLE 10

| Condition | Examples | 11 | 14 | 13 | 15 | 16 |
|---|---|---|---|---|---|---|
| 1 | 1 | 100CF | 100CF | 100CF | 100CF | 100CF |
| 1 | 2 | 100CF | 100CF | 100CF | 100CF | 100CF |
| 1 | 3 | 100CF | 100CF | 100CF | 100CF | 100CF |
| 2 | 1 | 100CF | 100CF | 100CF | 100CF | 100CF |
| 2 | 2 | 100CF | 100CF | 100CF | 100CF | 100CF |
| 2 | 3 | 100CF | 100CF | 100CF | 100CF | 100CF |
| 12 | 1 | 100CF | 100CF | 100CF | 100CF | 100CF |
| 12 | 2 | 100CF | 100CF | 100CF | 100CF | 100CF |
| 12 | 3 | 100CF | 100CF | 100CF | 100CF | 100CF |
| 4 | 1 | 0CF | 1@0CF, 1@10CF, 90AF | 90CF, 10AF | 1@20CF, 80AF; 1@80CF, 20AF | 0CF |
| 4 | 2 | 100CF | 100CF | 100CF | 100CF | 100CF |
| 4 | 3 | 100CF | 100CF | 100CF | 100CF | 100CF |
| 13 | 1 | | | 0CF | 0CF | |
| 13 | 2 | 0CF | 0CF | 0CF | 100CF | 0CF |
| 13 | 3 | 100CF | 100CF | 100CF | 100CF | 0CF |

TABLE 11

| | | 1000 Hrs WOM | | | | |
|---|---|---|---|---|---|---|
| Example | Adhesive | Sample 1 psi (kPa) | Sample 2 psi (kPa) | Sample 3 psi (kPa) | AVG Psi (kPa) | MOF |
| 11 | 1 | 544 (3751) | 737 (5081) | 549 (3785) | 610 (4206) | 100CF |
| 11 | 2 | 700 (4826) | 861 (5936) | 642 (4426) | 734 (3937) | 100CF |
| 11 | 3 | 581 (4006) | 619 (4268) | 511 (3523) | 571 (5061) | 100CF |
| 14 | 1 | 533 (3675) | 553 (3813) | 445 (3068) | 510 (3516) | 100CF |
| 14 | 2 | 611 (4213) | 563 (3882) | 498 (3434) | 557 (3840) | 100CF |

TABLE 11-continued

1000 Hrs WOM

| Example | Adhesive | Sample 1 psi (kPa) | Sample 2 psi (kPa) | Sample 3 psi (kPa) | AVG Psi (kPa) | MOF |
|---|---|---|---|---|---|---|
| 14 | 3 | 540 (3723) | 464 (3199) | 482 (3323) | 495 (3413) | 100CF |
| 13 | 1 | 638 (4399) | 601 (4144) | 470 (3241) | 569 (3923) | 100CF |
| 13 | 2 | 551 (3799) | 566 (3902) | 536 (3696) | 551 (3799) | 100CF |
| 13 | 3 | 602 (4151) | 560 (3861) | 578 (3985) | 580 (3999) | 100CF |
| 12 | 1 | 459 (3165) | 621 (4282) | 557 (3840) | 546 (3765) | 100CF |
| 12 | 2 | 632 (4357) | 688 (4744) | 594 (4095) | 638 (4399) | 100CF |
| 12 | 3 | 529 (3647) | 627 (4323) | 453 (3123) | 536 (3696) | 100CF |
| 15 | 1 | 466 (3213) | 801 (5523) | 490 (3378) | 586 (4040) | 100CF |
| 15 | 2 | 563 (3882) | 645 (4447) | 645 (4447) | 618 (4261) | 100CF |
| 15 | 3 | 531 (3661) | 631 (4351) | 356 (2455) | 506 (3489) | 100CF |

TABLE 12

2000 Hrs WOM

| Example | Adhesive | Sample 1 Psi (kPa) | Sample 1 Psi (kPa) | Sample 1 Psi (kPa) | Average Psi (kPa) | MOF |
|---|---|---|---|---|---|---|
| 14 | 3 | 0 (0) | 0 (0) | 0 (0) | 0 (0) | 0CF to glass side |
| 13 | 3 | 268 (1848) | 487 (3358) | 504 (3475) | 420 (2896) | 100CF to e-coat/0CF to glass side |
| 12 | 3 | 533 (3675) | 600 (4137) | 513 (3537) | 549 (3785) | 100CF |
| 15 | 1 | 530 (3654) | 578 (3985) | 566 (3902) | 558 (3847) | 100CF |
| 15 | 2 | 563 (3882) | 601 (4144) | 562 (3875) | 575 (3964) | 100CF |
| 12 | 1 | 647 (4461) | 460 (3172) | 730 (5033) | 612 (4220) | 0CF to glass/100CF to e-coat |
| 13 | 2 | 36 (248) | 206 (1420) | 260 (1793) | 167 (1151) | 0CF to glass/100CF to e-coat |
| 11 | 3 | 197 (1358) | 543 (3743) | 694 (4785) | 478 (3296) | 100CF for samples 2 and 3, for sample 1 0CF to glass/100CF to e-coat |
| 15 | 3 | 139 (958) | 110 (758) | 109 (752) | 119 (820) | 0CF to glass/100CF to e-coat |
| 16 | 2 | 139 (958) | 114 (786) | 192 (1324) | 148 (1020) | 0CF to glass with 30 percent PF/100CF to e-coat |
| 16 | 1 | 407 (2806) | 306 (2110) | 874 (6026) | 529 (3647) | 0CF to glass with 30 percent PF/100CF to e-coat (samples 1 and 2); 100CF sample 3 |
| 13 | 1 | 190 (1310) | 197 (1358) | 202 (1393) | 196 (1351) | 80 percentPF, 20AF, sample 1; 20 percentPF, 80AF, sample 2; 100AF sample 3 |
| 12 | 2 | 103 (710) | 78 (538) | 96 (662) | 92 (634) | 100AF |
| 14 | 2 | 0 (0) | 0 (0) | 0 (0) | 0 (0) | 100PF sample 1; 100PF, fell off samples 1 and 2 |
| 11 | 1 | 367 (1841) | 293 (2020) | 299 (2062) | 319 (2199) | 100AF |
| 14 | 1 | 240 (1655) | 122 (841) | 120 (827) | 161 (1110) | 100AF |
| 16 | 3 | 109 (752) | 71 (490) | 97 (669) | 92 (634) | 100AF |
| 11 | 2 | 253 (1744) | 257 (1772) | 239 (1648) | 250 (1724) | 100CF Samples 1 and 2; sample 100AF |

The following intermediates were prepared for use in Examples 16 to 38.

Preparation of Carbon Black Dispersion

Prior to making the carbon black dispersion, the carbon black powder (MOGUL™ E, Cabot) was dried in an oven for at least 2 days at 200° C. to remove any adsorbed moisture. Carbon black dispersions (44 g total) were prepared by first adding 1.32 g of a quaternary ammonium salt dispersant (VARIQUAT™ CC-42NS, diethyl polyproxy methyl ammonium chloride from Degussa) to 20.68 g of propoxylated neopentyl glycol diacrylate monomer (SR 9003, Sartomer) and mixing the components in a FlackTek SpeedMixer™ (Model DAC 150 FV-K, FlackTek Inc.) using a Max 60 cup for 3 minutes at 2,500 RPM. After the dispersant had dissolved, 22 g of the dried carbon black powder was added to the above solution and mixed again for 5 minutes at 2,000 RPM. Concentrations of the components were: Propoxylated neopentyl glycol diacrylate SR™ 9003, Sartomer (47 percent); quaternary ammonium salt dispersant VARIQUAT™ CC-42NS, Degussa (3 percent) and carbon black powder (MOGUL™ E. Cabot) dried, (50 percent).

After speed-mixing, the above solution was transferred to a 125 ml Nalgene bottle and filled with 60 g of yttria-stabilized zirconia milling beads (spherical geometry, d=5 mm)

and milled on a unitized jar mill (U.S. Stoneware) for at least 3 days at 30 rpm to break up any solid agglomerates and properly disperse the pigment in the monomer. After milling, the quality of dispersion was checked with a Fineness of Grind Gage to ensure that the fineness level was at least a Hegman rating of ≧7 (i.e. all particles less than 10 microns).

Preparation of Alumina Dispersion

Prior to making the alumina dispersion, the alumina powder (RC LS DBM, Baikowski-Malakoff) was dried in an oven for at least 2 days at 200° C. to remove any adsorbed moisture. Alumina dispersions (64 g total) were prepared by first adding 0.50 g of a phosphate acid ester dispersant (RHODAFAC™ RS-610, Rhodia) to 13.58 g of propoxylated neopentyl glycol diacrylate monomer (SR™ 9003, Sartomer) and mixing the components in a FlackTek SpeedMixer™ (Model DAC 150 FV-K, FlackTek Inc) using a Max 60 cup for 3 minutes at 2,500 rpm. After the dispersant was completely mixed in, 49.92 g of the dried alumina powder was added to the above solution and mixed again for 5 minutes at 2,500 rpm. Concentrations of the components are: propoxylated neopentyl glycol diacrylate (SR™ 9003, Sartomer (21.22 weight percent); phosphate acid ester dispersant (RHODAFAC™ RS-610, Rhodia) (0.78 weight percent) and alumina powder (RC LS DBM, Baikowski-Malakoff-dried, 200° C. (7.8 weight percent).

After speed-mixing, the above solution was; transferred to a 125 ml Nalgene bottle and filled with 60 g of yttria-stabilized zirconia milling beads (spherical geometry, d=5 mm) and milled on a unitized jar mill (U.S. Stoneware) for at least 3 days at 30 rpm to break up any solid agglomerates and properly disperse the filler in the monomer. After milling, the quality of dispersion was checked with a FINENESS of GRIND GAGE to ensure that the fineness level was at least a Hegman rating of ≧7 (i.e. all particles less than 10 microns).

Preparation of Polyethylene Dispersion

Polyethylene dispersions (20 g total) were prepared by adding 10 g of polyethylene powder (S-395N1, Shamrock Technologies) to 10 g of isobornyl acrylate monomer (SR™ 506D, Sartomer) and mixing the components in a FlackTek SpeedMixer™ (Model DAC 150 FV-K, FlackTek Inc) using a Max 60 cup for 5 minutes at 3000 RPM. The concentrations of the resulting paste are: isobornyl acrylate (SR™ 506D, Sartomer) (50 weight percent) and polyethylene powder (S-395N1™ (50 weight percent), Shamrock Technologies)

Preparation of Michael Adducts Adhesion Promoters

Michael adducts were prepared by adding 0.03 mol of bis[3-(trimethoxysilyl)propyl]amine, SILQUEST™ A-1170, GE Silicones; or bis[3-(triethoxysilyl)-propyl]amine, DYNASYLAN™ 1122, Degussa to 0.03 mol propoxylated neopentyl glycol diacrylate monomer (SR™ 9003, Sartomer) in a glass bottle and mixing with a vortex mixer for 1 minute. The resulting solution was heated at 55° C. for at least 3 days to complete the reaction and graft the amino silane to the acrylate. The resulting Michael addition product was confirmed by C-13 NMR and GC-MS. Adduct 1 is made using bis(3-(trimethoxysilyl)propyl) amine and Adduct 2 is made using bis(3-triethyloxysilyl)propyl)amine.

Example 16

Preparation of UV FRIT Coating Composition

The final coating composition (50 g) is prepared by simply mixing the above intermediates in a FlackTek SpeedMixer™ (Model DAC 150 FV-K, FlackTek Inc) using a Max 60 cup for 5 minutes at 3000 RPM. The remaining components are added and repeatedly speed-mixed until a homogeneous formulation results. Specific components and concentrations are described in Table 13:

TABLE 13

| Component | Grams | Wt. Percent |
|---|---|---|
| carbon black dispersion | 4.0000 | 8 |
| alumina dispersion | 19.0000 | 38 |
| vinyltrimethoxy silane[10] | 0.5000 | 1 |
| PTZ phenothiazine inhibitor | 0.0500 | 0.1 |
| Speed-mixed for 5 min. at 3,000 rpm | | |
| adduct[1] | 3.7500 | 7.5 |
| adduct[2] | 3.7500 | 7.5 |
| Speed-mixed for 5 min at 3,000 rpm | | |
| wetting agent[11] | 0.0500 | 0.1 |
| silicone defoamer[12] | 0.1500 | 0.3 |
| phosphine oxide photoinitiator[13] | 2.5000 | 5 |
| benzophenone photoinitiator blend[14] | 1.5000 | 3 |
| polyethylene dispersion (50 percent in IBOA)[15] | 2.5000 | 5 |
| Speed-mixed for 5 min. at 3,000 rpm | | |
| propoxylated glyceryl triacrylate[16] | 2.5000 | 5 |
| aliphatic urethane diacrylate oligomer[4] | 7.5000 | 15 |
| Speed-mixed for 5 min. at 3,000 rpm-2 times | | |
| acrylic acid | 2.2500 | 4.5 |
| speed-mix for 5 min. at 3,000 rpm | | |
| Total | 50.0000 | 100 |

[10]Available from Dow Corning under the designation Z-6300.
[11]BYK UV 32510 polydimethylsiloxane wetting agent available from BYK Chemie.
[12]FOAMBLAST ™ 20F silicone defoamer from Lubrizol/Noveon.
[13]ESACURE ™ KTO 46 2,4,6-trimethylbenzyl-diphenyl-phosphine oxide from Sartomer.
[14]ESACURE TZT benzophenone photoinitiator blend from Sartomer.
[15]50 percent S-395N1 ™ polyethylene wax powder dispersed in isobornyl acrylate available from Shamrock.
[16]SR9020 ™ HP propoxylated glyceryl triacrylate available from Sartomer.

After speed-mixing all of the components, the formulation is now ready to be applied on glass substrates.

Coating Application & UV Curing

Soda lime float glass substrates from Cat-I Manufacturing (4 inches (102 mm)×4 inches (102 mm)×5 mm thick) were cleaned with an isopropanol-soaked cotton wipe to remove any surface contaminants prior to applying the coating. After cleaning the glass substrates, the coating composition was applied, on the "tin-side" of the glass substrates (the "tin-side of the glass substrate is the side that shines light blue when exposed to a fluorescent lamp) using a number 10 wire wound rod to yield a dry film coating thickness of 13±2 microns (final coating thickness confirmed via profilometry). After a contact time of 1 minute, the coating was UV cured in air in less than 10 seconds with 1 pass at 10 feet/minute (3.05 meters) using a 600 W/inch Fusion D bulb (Fusion UV System) and 1.5 inch (3.81 cm) lamp-to-part distance. Specific irradiance and dosage conditions were measured with a Power Puck radiometer from EIT, Inc., as shown in Table 5.

After UV curing, the coating is tack-free and scratch resistant. However, full mechanical properties and adhesion performance are developed 1 to 2 weeks after UV curing, due to the secondary moisture curing of the coating from the alkoxy groups of the grafted amino silanes.

Property Testing

Liquid Coating Formulation—Working Time

Working time is defined as the time before these moisture sensitive coating formulations begin to skin when exposed to atmospheric conditions. In this experiment, 0.5 ml of the liquid coating formulation is dispensed into a plastic weigh dish and the sample is checked periodically to determine the time at which the coating formulation begins to skin. Once the formulation has skinned, the working time, as well, as, the temperature and humidity in the lab are recorded.

Liquid Coating Formulation—Shelf Stability

Shelf stability was measured according to a modified version of ASTM D4144-94. In this experiment, 10 g of the liquid coating formulation in a 30 ml glass bottle was placed in an oven set at 55° C. for 10 days. After 10 days, the liquid coating formulation was checked for any signs of gelation, skinning, or settling of pigments and fillers. In addition, some coating formulations were coated after the accelerated aging experiment to see if there was any effect on the performance of the UV cured coatings. A liquid formulation is considered shelf-stable if there are, no signs of gelation or hard packing of pigments and fillers after 10 days storage at 55° C. These coating formulations are predicted to have a 6 month shelf-life at room temperature (25° C.).

Coating Appearance—Opacity

To characterize the opacity of the coatings on glass, the percent light transmittance of the coatings was measured with a haze meter (Haze-Gard Plus, Byk-Gardner), in accordance with ASTM D1003 and D1044. All opacity data were acquired in total transmittance mode with a port hole size of 1 inch (2.54 cm).

Micro-Indentation Hardness Test

To assess the hardness of the coatings on glass, a FISCHERSCOPE® H100C (Fischer Technology) computer-controlled, ultra-low load dynamic micro indentation system was used, in conjunction with WIN-HCU® (Fischer Technology) control software. In this test, a Vickers indenter in the form of a straight diamond pyramid with square base and opposite sides angled at 136° was pressed into the surface of the coating with an applied force of 5 mN (rate=5 mN/20 seconds). The maximum load is then held for 20 seconds (creep step) followed by the releasing of the load (rate=5 mN/20 seconds). A final creep step of 20 seconds completes the test cycle. By taking into account the geometry of the indenter and the penetration depth for the applied force, a Universal Hardness measurement, HU, is obtained.

Cross-Hatch Adhesion

Adhesion of the UV cured coatings to glass was measured according to ASTM D3359 (cross-hatch adhesion). For this test, the coated sample was scribed with a cutter blade, cutting through the coating to form a cross-hatch pattern (typically 10 cuts by 10 cuts, with 2 mm spacing between lines). Double coated paper tape (3M No. 410) was then applied on the scribed area, pressed down, and then stripped away sharply in a direction perpendicular to the surface of the coated sample. The coating and tape were then visually inspected to see whether any of the coating was removed from the substrate by the tape. If >5 percent of the coating is removed, then the coating has failed the adhesion test. Specific ASTM ratings for the adhesion test are listed in Table 14:

TABLE 14

ASTM D3359 classification for adhesion

| ASTM D3359 Rating | Percent of Coating Removed |
| --- | --- |
| 5B | 0 percent (Perfect adhesion) |
| 4B | <5 percent |
| 3B | 5-15 percent |
| 2B | 15-35 percent t |
| 1B | 35-65 percent |
| 0B | >65 percent |

Based on the ASTM rating system, adhesion ratings of 4B and 5B are desired.

Boiling Water Adhesion

To assess the adhesion of UV cured coatings on glass, coated panels were immersed in boiling water (24 hours after UV curing), using a water bath (Fisher Scientific, Isotemp 210) set at 100° C. Coated panels were checked every 24 hours for any signs of adhesion failure (i.e. coating delamination, bubbling, blistering, cracking, etc.). Coated panels without adhesion failure after 6 days immersion were removed from the water bath. After drying for 24 hours, the cross-hatch adhesion of the coated panel was checked according to ASTM D3359.

Adhesion to Adhesives

The QKA test was used to assess the adhesion of Dow's BETASEAL™ glass bonding adhesives to the UV cured coatings. The samples were tested with three different adhesive formulations: BETASEAL™ 15625 adhesive, BETASEAL™ 15685 adhesive, and BETASEAL™ 15845 adhesive. The BETASEAL™ adhesives were applied to the coatings seven days after UV curing. After application, the adhesives were allowed to cure for 6 days at ~70° F. and 40-50 percent relative humidity (RH), prior to the QKA test.

Abrasion Resistance Test

All abrasion tests were performed on coatings applied on glass of dimensions: width and length of 4 inches (102 mm) and thickness of 5 mm, using a Taber Abraser (Model 5150, Taber Industries, Inc.) equipped with CS-10F abrasive wheels at a total abrasing load of 1000 grams (500 grams on each wheel), in accordance with ASTM D1044. In this experiment, the abrasive wheels revolve around the surface of the coating in a circular pattern for a specified number of revolutions (cycles), thereby creating a circular track where the coating has been abrased (scratched). For our purposes, the coated samples were Taber abrased for 500 or 1000 cycles. The percent change in light transmittance is the criterion for evaluating the abrasion resistance of the coating and was determined by measuring the difference in light transmittance of the unabrased and abrased areas of the coating using the haze meter, in accordance with ASTM D1003. For opaque coatings on glass, the change in percent light transmittance after. Taber abrasion should be less than 1 percent.

Chemical Resistance

Chemical resistance was tested on the UV cured coatings according to ASTM C724, where chemicals were placed on the coated panels for 15 minutes and covered with a watch glass to prevent evaporation. After 15 minutes, the chemicals were washed off with deionized water and the coatings were examined. Grades 1 (no effect to the coating) to 7 (coating is completely removed) are used to evaluate the coatings. A coating passes if the grades are less than or equal to 4. The following chemicals were used: kerosene, ethanol, 4 percent acetic acid in water, 5 percent sodium hydroxide in water, and 5 percent sodium chloride in water.

Examples 17-20

This example demonstrates that the use of the two Michael adduct adhesion promoters results in durable, long-term wet adhesion to glass without primers. The formulations was prepared using the materials listed and mixed as shown in Table 15.

TABLE 15

The following was added to a Max 60 cup

| Component | Grams | Wt. Percent |
|---|---|---|
| carbon black dispersion | 5.6000 | 8 |
| alumina dispersion | 26.6000 | 38 |
| vinyltrimethoxy silane[10] | 0.7000 | 1 |
| PTZ phenothiazine inhibitor | 0.0700 | 0.1 |
| photoinitiator[13] | 3.5000 | 5 |
| photoinitiator[14] | 2.1000 | 3 |
| Speed-mixed for 5 min. at 3,000 rpm | | |
| silicone defoamer[12] | 0.2100 | 0.3 |
| wetting agent[11] | 0.0700 | 0.1 |
| PE wax dispersion (50 wt. percent)[15] | 3.5000 | 5 |
| Speed-mixed for 5 min. at 3,000 rpm | | |
| propoxylated glyceryl triacrylate[16] | 3.5000 | 5 |
| aliphatic urethane diacrylate[4] | 10.5000 | 15 |
| Speed-mixed for 5 min. at 3,000 rpm-2 times | | |
| Total | 56.3500 | 80.5 |

The above formulation was split into separate Max 20 containers and mixed with additional components as listed below as follows:

| | Example | | | |
|---|---|---|---|---|
| Component | 17 Grams | 18 Grams | 19 Grams | 20 Grams |
| Above speed-mixed formulation | 8.05 | 8.05 | 8.05 | 8.05 |
| adduct | 0.75 | 0.75 | — | — |
| adduct | 0.75 | 0.75 | — | — |
| Speed-mixed for 5 min. at 3,000 rpm | | | | |
| acrylic acid | 0.45 | — | 0.45 | — |
| Speed-mixed for 5 min. at 3,000 rpm | | | | |
| Total | 10.00 | 9.55 | 8.50 | 8.05 |

The results are compiled in Table 16.

TABLE 16

| Results | 17 | 18 | 19 | 20 |
|---|---|---|---|---|
| working time at 66 F./58 percent RH | 18 minutes | >5 hours | >5 hours | >5 hours |
| shelf-life at 55° C. | Pass, 10 days | Pass, 10 days | Pass, 10 days | Pass, 10 days |
| light transmittance (percent) | 0.09 | 0.18 | 0.04 | 0.05 |
| cross-hatch adhesion (initial) | 5B | 1B | 2B | 0B |
| cross-hatch adhesion (after 24 h) | 5B | 3B | 3B | 0B |
| boiling water adhesion | Pass, 6 days, 4B | Fail, 8 hours | Fail, 6 hours | Fail, in <1 hour |
| universal hardness (initial) | 84.46 | 27.73 | 172.35 | 109.51 |
| universal hardness (after 7 days) | 209.9 | 99.8 | 194.7 | 116.0 |

The above data shows that coatings containing both adhesion promoters have superior dry and wet adhesion. The data shows tremendous improvement in boiling water adhesion when both adhesion promoters are used. Moreover, coatings with both adhesion promoters also show improved hardness, seven days after UV curing.

Examples 21 to 26

These examples demonstrate that reducing the concentration of either the acrylic acid or Michael adducts can significantly lengthen the working time, without significantly affecting adhesion or other performance properties. The formulations and their preparation are illustrated in Table 17.

TABLE 17

The following was added to a Max 60 cup:

| Component | Grams | Wt. Percent |
|---|---|---|
| carbon black dispersion | 6.2410 | 7.9 |
| alumina dispersion | 29.8620 | 37.8 |
| vinyltrimethoxy silane | 0.7900 | 1 |
| PTZ phenothiazine inhibitor | 0.0790 | 0.11 |
| Speed-mixed for 5 min. at 3,000 rpm | | |
| photoinitiator[13] | 3.9500 | 5 |
| photoinitiator[14] | 2.3700 | 3 |
| PE wax dispersion[15] | 3.9500 | 5 |
| Speed-mixed for 5 min. at 3,000 rpm | | |
| wetting agent[11] | 0.1580 | 0.2 |
| defoamer[12] | 0.3950 | 0.5 |
| Speed-mixed for 5 min. at 3,000 rpm | | |
| propoxylated glyceryl triacrylate[16] | 3.9500 | 5 |
| aliphatic urethane diacrylate[4] | 11.8500 | 15 |
| Speed-mixed for 5 min. at 3,000 rpm-2 times | | |
| Total | 63.5950 | 80.5 |

The above formulation was split into separate Max 20 containers and mixed with additional components as follows.

| | Example | | | | | |
|---|---|---|---|---|---|---|
| Component | 21 Grams | 22 Grams | 23 Grams | 24 Grams | 25 Grams | 26 Grams |
| above speed-mixed formulation | 8.05 | 8.05 | 8.05 | 8.05 | 8.05 | 8.05 |
| adduct | 0.75 | 0.70 | 0.65 | 0.75 | 0.70 | 0.65 |
| adduct | 0.75 | 0.70 | 0.65 | 0.75 | 0.70 | 0.65 |
| Speed-mixed for 5 min. at 3,000 rpm | | | | | | |
| acrylic acid | 0.45 | 0.45 | 0.45 | 0.35 | 0.35 | 0.35 |
| Speed-mixed for 5 min. at 3,000 rpm | | | | | | |
| Total | 10.00 | 9.90 | 9.80 | 9.90 | 9.80 | 9.70 |

The results are compiled in Table 18.

TABLE 18

|  | Examples | | | | | |
| --- | --- | --- | --- | --- | --- | --- |
|  | 21 | 22 | 23 | 24 | 25 | 26 |
| Acrylic Acid Conc. | 4.5 percent | 4.5 percent | 4.5 percent | 3.5 percent | 3.5 percent | 3.5 percent |
| combined concentration of adducts | 15 percent | 14 percent | 13 percent | 15 percent | 14 percent | 13 percent |
| working time at 66 F./44 percent RH | 20 minutes | 20 minutes | 30 minutes | 25 minutes | 26 minutes | 45 minutes |
| shelf-life at 55° C. | Pass, 10 days | Pass, 10 days | Pass, 10 days | Pass, 10 days | Pass, 10 days | Pass, 10 days |
| light transmittance (percent) | 0.08 | 0.15 | 0.14 | 0.07 | 0.06 | 0.01 |
| cross-hatch adhesion (initial) | 5B | 5B | 5B | 5B | 5B | 5B |
| boiling water adhesion | Pass, 6 days, 4B | Pass, 6 days, 4B | Pass, 6 days, 4B | Pass, 6 days, 4B | Pass, 6 days, 4B | Pass, 6 days, 4B |
| univ. hardness (after 24 h) | 144.68 | 164.75 | 144.92 | 127.41 | 123.33 | 105.13 |

All of these coatings passed QKA 100 percent CF adhesion to BETASEAL™ adhesives, when tested dry.

Examples 27-33

These experiments demonstrate that by increasing the amount of the hexaethoxy Michael adduct (Adduct II) that the working time can be increased and without negatively affecting adhesion.

Base formulations as described in Examples 21-26 were prepared and placed into Max 20 cups. A varying ratio of Adduct I and II are added to the formulation and tested as described before. Adduct 1 has all methoxy silane groups, and Adduct II has all ethoxy silane groups. Table 19 shows the adduct amounts of the formulation. Table 20 shows the test results.

TABLE 19

|  | Example | | | |
| --- | --- | --- | --- | --- |
| Component | 27 Grams | 28 Grams | 29 Grams | 30 Grams |
| above speed-mixed formulation | 8.05 | 8.05 | 8.05 | 8.05 |
| adduct$^1$ | 1.50 | 0.75 | 0.60 | 0.45 |
| adduct$^2$ | — | 0.75 | 0.90 | 1.05 |
| Speed-mixed for 5 min. at 3,000 rpm | | | | |
| acrylic acid | 0.45 | 0.45 | 0.45 | 0.45 |
| Speed-mixed for 5 min. at 3,000 rpm | | | | |
| Total | 10.00 | 10.00 | 10.00 | 10.00 |

|  | Example | | |
| --- | --- | --- | --- |
| Component | 31 Grams | 32 Grams | 33 Grams |
| above speed-mixed formulation | 8.05 | 8.05 | 8.05 |
| adduct$^1$ | 0.30 | 0.15 | — |
| adduct$^2$ | 1.20 | 1.35 | 1.5 |
| Speed-mixed for 5 min. at 3,000 rpm | | | |
| acrylic acid | 0.45 | 0.45 | 0.45 |
| Speed-mixed for 5 min. at 3,000 rpm | | | |
| Total | 10.00 | 10.00 | 10.00 |

TABLE 20

|  | Example | | | | | | |
| --- | --- | --- | --- | --- | --- | --- | --- |
|  | 27 | 28 | 29 | 30 | 31 | 32 | 33 |
| percent of alkoxy which are ethoxy | 0 percent | 50 percent | 60 percent | 70 percent | 80 percent | 90 percent | 100 percent |
| working time at 73° F./36 percent RH | 6 minutes | 18 minutes | 24 minutes | 28 minutes | 32 minutes | 38 minutes | 53 minutes |
| shelf-life at 55° C. | Pass, 10 days | Pass, 10 days | Pass, 10 days | Pass, 10 days | Pass, 10 days | Pass, 10 days | Pass, 10 days |
| light transmittance (percent) | 0.12 | 0.09 | 0.11 | 0.11 | 0.17 | 0.05 | 0.06 |
| cross-hatch adhesion (initial) | 4B | 4B | 4B | 4B | 4B | 4B | 4B |

TABLE 20-continued

| | Example | | | | | | |
|---|---|---|---|---|---|---|---|
| | 27 | 28 | 29 | 30 | 31 | 32 | 33 |
| boiling water adhesion | Pass, 6 days, 4B | Pass, 6 days, 4B | Pass, 6 days, 4B | Pass, 6 days, 4B | Pass, 6 days, 4B | Pass, 6 days, 4B | Pass, 6 days, 5B |
| univ. hard. (after 24 h) | 162.27 | 123.61 | 119.76 | 136.35 | 132.44 | 115.84 | 121.89 |

Example 34

A series of coatings prepared as described in Table 21 were UV cured and tested for hardness after the time designated. The results are compiled in Table 22.

TABLE 21

The following components were added to a Max 60 cup

| Component | Grams | Wt. Percent |
|---|---|---|
| carbon black dispersion | 3.2000 | 8 |
| alumina dispersion | 15.1600 | 37.9 |
| vinyltrimethoxy silane[10] | 0.4000 | 1 |
| PTZ phenothiazine inhibitor | 0.0400 | 0.1 |
| Speed-mixed for 5 min. at 3,000 rpm | | |
| adduct[2] | 6.0000 | 15 |
| wetting agent[17] | 0.0400 | 0.1 |
| defoamer[12] | 0.1600 | 0.4 |
| Speed-mixed for 5 min. at 3,000 rpm | | |
| photoinitiator[13] | 2.0000 | 5 |
| photoinitiator[14] | 1.2000 | 3 |
| PE wax dispersion[15] | 2.0000 | 5 |
| Speed-mixed for 5 min. at 3,000 rpm | | |
| propoxylated glyceryl triacrylate[16] | 2.0000 | 5 |
| aliphatic urethane diacrylate[4] | 6.0000 | 15 |
| Speed-mixed for 5 min. at 3,000 rpm-2 times | | |
| acrylic acid | 1.8000 | 4.5 |
| Speed-mixed for 5 min. at 3,000 rpm | | |
| Total | 40.0000 | 100 |

[17]Tego Rad ™ 2200 N wetting agent available from Tego Chemie (Degussa).

TABLE 22

| Time after UV Curing (days) | Universal Hardness (N/mm2) |
|---|---|
| 0 | 75.81 |
| 1 | 151.31 |
| 2 | 188.97 |
| 5 | 215.18 |
| 7 | 221.91 |

The hardness nearly triples after coated panels are exposed to atmospheric moisture for 7 days after UV curing (during the exposure period, the typical lab conditions were ~65° F. and 55 percent RH).

Example 35

The formulation described in Table 13 was coated on glass and used as described above. The coatings were tested for chemical resistance after 14 days from UV curing. The results are compiled in Table 23. The coatings were also tested for abrasion resistance and the results are compiled in Table 24. The coatings were also exposed to accelerated aging tests. The results are compiled in Table 25.

TABLE 23

| CHEMICAL | GRADE |
|---|---|
| Kerosene | Pass, Grade 1, no effect |
| Ethanol | Pass, Grade 2, very slight gloss change |
| 4 percent acetic acid in water | Pass, Grade 2, very slight gloss change |
| 5 percent sodium chloride in water | Pass, Grade 1, no effect |
| 5 percent sodium hydroxide in water | Pass, Grade 4, noticeable color change |

Table 22 shows only the sodium hydroxide solution has any significant effect on the coatings. However, the coating still has a passing grade to the sodium hydroxide solution.

TABLE 24

| Taber Abrasion Cycles | Light Transmittance (percent) | Change in Transmittance (percent) |
|---|---|---|
| 0 | 0.06 | N/A |
| 500 | 0.07 | 0.01 |
| 1,000 | 0.12 | 0.06 |

Table 23 shows that the coatings have excellent abrasion resistance and that even after 1000 Taber cycles, the change in light transmittance in the abrased area is only 0.06 percent (much below the test specification of <1 percent). The coatings also had excellent scratch resistance to #000 steel wool (only minimal scratches were observed when steel wool was used to rub the surface of the coatings).

TABLE 25

| Storage time and temperature | Working time (min) | Lab Conditions for working time | X-Hatch Adhesion | Boiling Water Adhesion |
|---|---|---|---|---|
| 0 (checked immediately) | 18 min | 64 F., 48 percent RH | 5B | Pass 6 days |
| 0 (repeat) | 19.5 min | 63 F., 63 percent RH | 5B | Pass 6 days |
| 5 hr, 25° C. | 23 min | 64 F., 48 percent RH | 5B | Pass 6 days |
| 1 day, 25° C. | 26 min | 63 F., 57 percent RH | 5B | Pass 6 days |
| 1 day, 55° C. | >60 min | 63 F., 57 percent RH | 5B | Pass 6 days |
| 1 day, 55° C. (repeat) | >60 min | 63 F., 59 percent RH | 5B | Pass 6 days |
| 2 days, 55° C. | >60 min | 63 F., 57 percent RH | 5B | Pass 6 days |
| 2 days, 55° C. (repeat) | >60 min | 63 F., 65 percent RH | 4B | Pass 6 days |
| 3 days, 55° C. | >60 min | 63 F., 56 percent RH | 3B initial/ 5B after 8 h | Pass 6 days |
| 4 days, 55° C. | >60 min | 66 F., 48 percent RH | 5B | Pass 6 days |
| 10 days, 55° C. | >60 min | 65 F., 53 percent RH | 4B | Pass 6 days |

Table 25 shows that aged formulations still demonstrate excellent dry and wet adhesion. Moreover, aging the liquid coating formulations at 55° C. improves the working time significantly, without affecting adhesion. All of these coatings passed 100 percent CF adhesion to BETASEAL™ adhesives, when tested dry, as well as, after immersion in boiling water for 24 hours.

Examples 36-42

Coatings in Various Colors

To demonstrate that these coatings can be made into other colors, besides black, by using various pigment dispersions. These colored coatings could be used for automotive coatings or for non-automotive applications, such as for decorative coatings on glass.

The following pigment dispersions from Penn Color were used to prepare pigmented coatings of the invention. Each pigment was dispersed in propoxylated neopentyl glycol diacrylate. The formulations were prepared as described in Table 26.

TABLE 26

| Product Name | Pigment | Pigment Concentration |
|---|---|---|
| 9 S727 blue dispersion | P. Blue 15:3 (phthalocyanine blue) | 30 wt. percent |
| 9 R232 red dispersion | P. Red 149 perylene red | 12 wt. percent |
| 9 G607 green dispersion | P. Green 7 (phthalocyanine green) | 30 wt. percent |
| 9 Y311 yellow dispersion | P. Yellow 128 (azo yellow) | 24 wt. percent |
| 9 W892 white dispersion | P. White 6 (titanium dioxide) | 75 wt. percent |
| 9 B989 black dispersion | P. Black 7 (carbon black) | 45 wt. percent |
| Carbon black dispersion (50 percent in 9003 with CC-42NS) | P. Black 7 (MOGUL ™ E carbon black) | 55 wt. percent |

The following were added to a Max 60 cup

| Component | Grams | Wt. Percent |
|---|---|---|
| alumina dispersion (78 percent in 9003 with Rhod RS-610) | 27.9720 | 37.8 |

TABLE 26-continued

| | | |
|---|---|---|
| Z-76300 vinyltrimethoxy silane moisture scavenger | 0.7400 | 1 |
| PTZ phenothiazine inhibitor | 0.0740 | 0.1 |
| Speed-mixed for 5 min. at 3,000 rpm | | |
| adduct[1] | 5.5500 | 7.5 |
| adduct[2] | 5.5500 | 7.5 |
| Speed-mixed for 5 min. at 3,000 rpm | | |
| photoinitiator[13] | 3.7000 | 5 |
| photoinitiator[14] | 2.2200 | 3 |
| PE wax dispersion[15] | 3.7000 | 5 |
| Speed-mixed for 5 min. at 3,000 rpm | | |
| wetting agent | 0.1480 | 0.2 |
| Silicone defoamer | 0.3700 | 0.5 |
| Speed mixed-for 5 min. at 3,000 rpm | | |
| propoxylated glyceryl triacrylate[16] | 3.7000 | 5 |
| aliphatic urethane diacrylate[4] | 11.1000 | 15 |
| Speed-mixed for 5 min. at 3,000 rpm - 2 times | | |
| Total | 64.8240 | 87.6 |

The above was added into separate Max 20 containers and the following components were added:

| Component | Grams | Weight Percent |
|---|---|---|
| above speed-mixed formulation | 8.76 | 87.6 |
| pigment dispersions from Table 25 | 0.79 | 7.9 |
| Speed-mixed for 5 min. at 3,000 rpm | | |
| acrylic acid | 0.45 | 4.5 |
| Speed-mixed for 5 min. at 3,000 rpm | | |
| Total | 10.00 | 100.00 |

TABLE 27

| | Examples | | | | | | |
|---|---|---|---|---|---|---|---|
| | 36 | 37 | 38 | 39 | 40 | 41 | 42 |
| Results/Color | BLUE | RED | GREEN | YELLOW | WHITE | PENN BLACK | DOW BLACK |
| working time at 70° F./46 percent RH | 22 minutes | 28 minutes | 20 minutes | 23 minutes | 16 minutes | 16 minutes | 17 minutes |
| shelf-life at 55° C. | Pass, 10 days | Pass, 10 days | Pass, 10 days | Pass, 10 days | Pass, 10 days | Pass, 10 days | Pass, 10 days |
| light transmittance (percent) | 18.3 | 32.2 | 34.3 | 64.2 | 33.7 | 0.13 | 0.12 |
| cross-hatch adhesion (initial) | 5B | 5B | 5B | 4B | 5B | 4B | 5B |
| boiling water adhesion | Pass, 6 days, 4B | Pass, 6 days, 4B | Pass, 6 days, 4B | Pass, 6 days, 4B | Pass, 6 days, 4B | Pass, 6 days, 4B | Pass, 6 days, 4B |
| univ. hard. (after 24 h) | 150.67 | 160.37 | 147.15 | 153.27 | 173.90 | 113.20 | 151.84 |

The results show that the coatings can be made using a variety of other colors, without significantly affecting the shelf-stability of the liquid formulations or adhesion of the cured coatings. Moreover, all of these coatings passed 100 percent CF adhesion to BETASEAL™ adhesives, when tested dry.

Examples 37-38

A high molecular weight alkoxysilane functional adduct was prepared as described below. The adduct is referred to as Adduct III.

The high molecular weight adduct was prepared by additiong 222 g of DYNASILAN™ Damo aminopropyl trimethoxy silane and 269 g (epoxy equivalents to amine equivalents ratio 14:1) and SILQUEST™ A-187 epoxypropyl trimethoxy silane and mixed at 60° C. for 5 hours. The resulting reaction product Intermediate A was tested for amine and epoxy equivalents. The target amine equivalent weight is 240-250. 50.04 g of isobornyl acrylate is added 28.03 g of Intermediate A and the temperature is adjusted to 40-45° C. 21.93 g of intermediate B is slowly added with agitation. The mixture was mixed for 15 minutes. Intermediate B was prepared by contacting (TMDI) and 91.31 of trimethyl hexaethylene diisocyanate and 58.41 g of DYNASILON™ MTMO 58.41 g of mercaptopropyl trimethoxysilane and mixing at 50° C. Dibutyl tin dilaurate (0.105 g) 0.105 g toluene was in 0.705 g added. The mixture exotherms at 85° C. for 60 minutes. The reaction is allowed to proceed until the isocyanate content is at 15.6-16 percent.

The resulting adduct was used in the coating formulation described and prepared as described in Table 29.

The coatings were applied to glass to the "tin side" of the glass using #10, #8 wire wound rod to yield a dry fiber coating thickness of 13 microns. The coatings were cured by UV light from a xenon lamp 10 second residence time in one pair at 10 feet per minute. The coatings were tested after 3 days. Adhesives were applied as described before and tested after different exposure conditions. The results are compiled in Table 29.

TABLE 28

Adhesion Data

| | Examples | |
|---|---|---|
| | 37 | 38 |
| 1. Hardness | | |
| 0 day open | 600 | 600 |
| 4 days open | 1400 | 1200 |
| 2. Cross hatch | | |
| 0 day open | 3B | 3B |
| 4 days open | 4B | 4B |
| 3. Adhesion | | |
| A. Room Temp. | | |
| Adhesive 1 | 100CF | 100CF |
| Adhesive 2 | 100CF | 100CF |
| Adhesive 3 | 100CF | 100CF |
| B. 14 days at 38/100 | | |
| Adhesive 1 | 100CF | 100CF |
| Adhesive 2 | 100CF | 100CF |
| Adhesive 3 | 100CF | 0CF |
| C. cataplasma | | |
| 1 | 100CF | 100CF |
| 2 | 100CF | 100CF |
| 3 | 100CF | 100CF |

TABLE 28-continued

Adhesion Data

| | Examples | |
|---|---|---|
| | 37 | 38 |
| Exposure | | |
| D. 90° C. water bath | | |
| 1 day | | |
| 1 | 100CF | 100CF |
| 2 | 100CF | 100CF |
| 3 | 100CF | 100CF |
| 2 days | | |
| 1 | 100CF | 100CF |
| 2 | 100CF | 100CF |
| 3 | 100CF | 100CF |
| 3 days | | |
| 1 | 100CF | 100CF |
| 2 | 100CF | 100CF |
| 3 | 100CF | 100CF |
| 4 days | | |
| 1 | 100CF | 95CF, 5PF |
| 2 | 100CF | 100CF |
| 3 | 100PF | 95CF, 5PF |
| 5 days | | |
| 1 | 50CF, 50PF | 30CF, 70PF |
| 2 | 100CF | 50CF, 50AF |
| 3 | | 100PF |
| E. 80° C./100 percent RH | | |
| 7 days | | |
| 1 | 100CF | 30CF, 70PF |
| 2 | 100CF | 100CF |
| 3 | 100CF | 100CF |

The cataplasma testing procedure is subjecting the samples to a heated water bath at 70° C. for 7 days. The samples are wrapped in cotton wool and sealed in a polyethylene bag. Next, the samples were placed in a freezer for 16 hours at −20° C., after which the sample was allowed to stand at room temperature for 2 hours. The cycle is repeated multiple time, after which the sample was removed from the bag and subjected to the QKA test.

The tested coatings showed a universal hardness of 181, a Vickers hardness 14, a Modutus (6 Pa) of 4.82, a maximum indentation of: 875 micrometers and a percent transmittance of light of 0.22 percent.

TABLE 29

| | Examples | |
|---|---|---|
| | 37 Grams | 38 Grams |
| carbon black dispersion | 2.73 | 2.73 |
| alumina dispersion | 13.20 | 13.20 |
| vinyltrimethoxy silane[10] | 0.35 | 0.35 |
| PTZ phenothiazine | 0.04 | 0.04 |
| Speed mixed for 5 min. at 3,000 rpm | | |
| adduct I | 2.63 | 0.00 |
| adduct II | 2.63 | 5.00 |
| adduct III | 2.00 | 4.00 |
| Speed mixed for 5 min. at 3,000 rpm | | |
| wetting agent | 0.175 | 0.175 |
| silicone defoamer | 0.175 | 0.175 |

TABLE 29-continued

|  | Examples | |
| --- | --- | --- |
|  | 37 Grams | 38 Grams |
| phototinitiator[13] | 1.75 | 1.75 |
| photoinitiator[14] | 1.05 | 1.05 |
| isobornyl acrylate | 1.00 | 1.00 |
| aliphatic urethane diacrylate[4] | 7.00 | 7.00 |
| acrylic acid | 1.575 | 1.575 |
| Total |  | 36.29 |

[18]FOAMBLAST ™ 30 F silane defoamer from Lubrizol.

What is claimed is:

1. Compositions comprising
    a) one or more film forming resins having at least one functional group capable of polymerization;
    b) one or more reactive diluents capable of reacting with the film forming resin;
    c) one or more compounds capable of promoting adhesion of the composition to glass comprising a Michael addition product of a siloxane further containing one or more hydrogen containing functional moieties with a compound having two or more acrylate groups wherein the addition products have four or greater siloxy groups and at least one acrylate group;
    d) one or more fillers capable of imparting abrasion resistance to the composition when polymerized; and
    e) one or more compounds which is reactive with the film forming resin which also contains at least one acidic moiety.

2. Compositions according to claim 1 which further comprises f) one or more pigments or dyes.

3. Compositions according to claim 2 wherein at least one of the one or more pigments are capable of blocking the transmission of ultraviolet light.

4. Compositions according to claim 3 wherein the functional groups capable of polymerization of the film-forming resin polymerize when exposed to irradiation and the composition further comprises g) one or more catalysts or initiators capable of initiating polymerization of the film-forming resin.

5. Compositions according to claim 4 wherein the one or more film-forming resins contain unsaturated moieties which polymerize when exposed to ultraviolet light and the initiator is a photoinitiator.

6. Compositions according to claim 5 wherein the one or more film forming resins contain unsaturated moieties which polymerize when exposed to electron beams.

7. Compositions according to claim 4 which further comprises one or more surfactants, dispersants, inhibitors, or mixtures thereof.

8. Compositions according to claim 4 wherein the film forming resins, and reactive diluents have acrylate functional moieties.

9. A composition according to claim 4 wherein adhesion promoter comprises a mixture of a Michael addition adduct and a high molecular weight adduct having multiple alkoxysilanes.

10. Compositions according to claim 4 wherein the one or more compounds containing at least one acidic moiety comprise one or more carboxylic acid moieties, one or more phosphate acids or a mixture thereof.

11. Compositions according to claim 8 wherein the acid moieties comprise carboxylic acids.

12. Compositions according to claim 3 wherein the pigment is carbon black.

13. Compositions according to claim 4 comprising:
    a) from about 10 to about 70 parts by weight of the one or more film forming resin;
    b) from about 2 to about 30 parts by weight of the one or more reactive diluents;
    c) from about 0.1 to about 30 parts by weight of the one or more adhesion promoter;
    d) from about 1 to about 15 parts by weight of the one or more pigments;
    e) from about 5 to about 60 parts by weight of the one or more fillers;
    f) from about 1 to about 10 parts by weight of the one or more compounds containing at least one acidic moiety;
    g) from about 2 to about 20 parts by weight of the one or more catalysts or initiators; and
    wherein the composition contains 100 parts.

* * * * *